US010862746B2

(12) United States Patent
Buckley et al.

(10) Patent No.: US 10,862,746 B2
(45) Date of Patent: Dec. 8, 2020

(54) POLICING OF PACKET SWITCHED SERVICES

(71) Applicant: BlackBerry Limited, Waterloo (CA)

(72) Inventors: Adrian Buckley, Tracy, CA (US); Nicholas James Russell, New Berry (GB); Jan Hendrik Lucas Bakker, Fort Worth, TX (US)

(73) Assignee: BlackBerry Limited, Ontario (CA)

( * ) Notice: Subject to any disclaimer, the term of this patent is extended or adjusted under 35 U.S.C. 154(b) by 0 days.

(21) Appl. No.: 16/328,099

(22) PCT Filed: Aug. 25, 2017

(86) PCT No.: PCT/EP2017/071474
§ 371 (c)(1),
(2) Date: Feb. 25, 2019

(87) PCT Pub. No.: WO2018/037126
PCT Pub. Date: Mar. 1, 2018

(65) Prior Publication Data
US 2019/0190775 A1 Jun. 20, 2019

Related U.S. Application Data

(60) Provisional application No. 62/379,424, filed on Aug. 25, 2016.

(51) Int. Cl.
H04L 12/24 (2006.01)
H04L 29/08 (2006.01)
(Continued)

(52) U.S. Cl.
CPC ............ H04L 41/08 (2013.01); H04L 12/66 (2013.01); H04L 47/20 (2013.01);
(Continued)

(58) Field of Classification Search
CPC ..... H04L 67/28; H04L 65/1006; H04L 47/20; H04L 41/08; H04L 12/66; H04M 17/103;
(Continued)

(56) References Cited

U.S. PATENT DOCUMENTS

2007/0190990 A1* 8/2007 Yin .................. H04W 8/18
455/414.3
2018/0359662 A1* 12/2018 Kim .................. H04L 65/1016
(Continued)

FOREIGN PATENT DOCUMENTS

EP 3267650 A1 * 1/2018 ............. H04W 8/18
WO 2015158363 10/2017

OTHER PUBLICATIONS

Notification of Transmittal of the International Search Report and the Written Opinion of the International Searching Authority dated Oct. 10, 2017 for International Application No. PCT/EP2017/071474.

(Continued)

Primary Examiner — Benjamin H Elliott, IV
(74) Attorney, Agent, or Firm — Conley Rose, P.C.; J. Robert Brown, Jr.; Joseph J. Funston, III

(57) ABSTRACT

A method, computer program product, user equipment (UE) and packet data network gateway (P-GW) are provided for activating "Data Off" services using protocol configuration options (PCO). The UE sends a first indication to a first network node as part of the PCO. The first indication includes a Data Off indication indicating whether a "Data Off" service is activated. The first network node may be a P-GW. If the Data Off indication indicates that the "Data Off" service is deactivated, the UE receives downlink data from the first network node. If the Data Off indication indicates that the "Data Off" service is activated, the UE (Continued)

either receives no downlink data from the first network node or receives an error message from the first network node.

22 Claims, 10 Drawing Sheets

(51) Int. Cl.
| | |
|---|---|
| *H04W 4/24* | (2018.01) |
| *H04M 17/00* | (2006.01) |
| *H04M 15/00* | (2006.01) |
| *H04M 17/02* | (2006.01) |
| *H04L 12/66* | (2006.01) |
| *H04L 12/813* | (2013.01) |
| *H04L 29/06* | (2006.01) |
| *H04W 8/02* | (2009.01) |
| *H04W 36/00* | (2009.01) |

(52) U.S. Cl.
CPC .......... *H04L 65/1006* (2013.01); *H04L 67/28* (2013.01); *H04M 15/39* (2013.01); *H04M 15/66* (2013.01); *H04M 15/70* (2013.01); *H04M 15/725* (2013.01); *H04M 15/73* (2013.01); *H04M 17/02* (2013.01); *H04M 17/103* (2013.01); *H04W 4/24* (2013.01); *H04W 8/02* (2013.01); *H04W 36/0022* (2013.01)

(58) Field of Classification Search
CPC .... H04M 17/02; H04M 15/73; H04M 15/725; H04M 15/70; H04M 15/66; H04M 15/39; H04W 4/24; H04W 8/02; H04W 36/0022
See application file for complete search history.

(56) References Cited

U.S. PATENT DOCUMENTS

| | | | |
|---|---|---|---|
| 2018/0368050 A1* | 12/2018 | Chun | H04W 36/0022 |
| 2019/0190775 A1* | 6/2019 | Buckley | H04L 47/20 |
| 2019/0357090 A1* | 11/2019 | Drevon | H04W 4/24 |

OTHER PUBLICATIONS

Huawei et al: "Solution for how UE to report PS Data Off status to EPC", #GPP Draft; S2-163383_Solution for How UE to Report PS Data Off Status to EPC, 3rd Generation Partnership Oroject (#GPP), Mobile Competence Centre; 650, Route Des Lucioles; F-06921 Sophia-Antipolis, vol. SA WG2, No. Vienna; Jul. 11, 2016-Jul. 15, 2016, Jul. 10, 2016; Retrieved from the Internet: URL:httpp//www.3gpp.org/ftp/Meetings_3GPP_SYCE/SA2/Docs on Jul. 10, 2016. 2016.
International Preliminary Report on Patentability and Written Opinion of the International Searching Authority issued for International Application No. PCT/EP2017/071474 and dated Mar. 7, 2019.
Communication Under Rule 71(3) EPC issued for European patent application No. 17758859.7 dated Mar. 23, 2020.

* cited by examiner

POLICING OF PACKET SWITCHED SERVICES

CROSS-REFERENCE TO RELATED APPLICATIONS

This application is based upon and claims priority from prior U.S. Provisional Patent Application No. 62/379,424, filed on Aug. 25, 2016, the disclosure of which is herein incorporated by reference in its entirety.

BACKGROUND

Technical Field

The present disclosure generally relates to packet switched services in a cellular network and more specifically to policing packet switched network data services to allow for various methods of disabling data services.

Description of the Related Arts

Cellular network subscribers have become accustomed to specific charging models regarding different services. For example, voice may be time based, Short Message Service (SMS) may be transaction based, while applications and browsing may be data-quantity based. To reduce bills, subscribers may disable data services, especially when roaming or approaching data limits. However, disabling services has undesirable effects.

When a subscriber disables data, operators who offer traditionally circuit switched (CS) based services (e.g., Voice, SMS, etc.) via Long Term Evolution (LTE) and Universal Terrestrial Radio Access Network (UTRAN) data equivalents (e.g., Voice over LTE (VoLTE), SMS over Internet Protocol Multimedia Subsystem (IMS), etc.) have these data based services disabled. In a worst-case scenario, where there is no CS domain, subscribers disabling their data services also disable their Voice and SMS services. Subscribers have no idea why these services have been disabled as the subscribers associate disabling data services with volume based charged services, (e.g., browsing, data-based applications/services, etc.). Operators wish to resolve this problem by allowing data equivalent services to be allowed on a per Public Land Mobile Network (PLMN) basis, even when the user has selected 'Data Off'.

In addition, some existing implementations of disabling of data services do not always result in all traffic being disabled to the device. This is the case when the disabling of data is achieved by implementing an internal firewall in the device. The network can still send data packets to the device, resulting in charging records being created and subscribers receiving bills for data that they perceive they have disabled.

Further, existing solutions do not explain how mobile-terminated traffic is to be enforced such that charging records are not created in the network and so that the user is not unnecessarily billed. Solutions that impact the network (e.g., the Mobility Management Entity (MME)) also mean that when the device (i.e. the user equipment (UE)) is roaming, the Visited Public Land Mobile Network (VPLMN) will need to upgrade its infrastructure (i.e. the MME). Also, a Home Public Land Mobile Network (HPLMN) depends on all of its roaming partners to upgrade infrastructure to support an HPLMN service. Upgrading of equipment costs money and takes time. An HPLMN that quickly wants to deploy such a service is now dependent upon all of its roaming partners.

BRIEF SUMMARY

In one embodiment, a method in a user equipment (UE) to activate "Data Off" services using protocol configuration options is disclosed. The method comprises sending a first indication to a first network node as part of the protocol configuration options, the first indication including a Data Off indication indicating whether a "Data Off" service is activated. If the Data Off indication indicates that the "Data Off" service is deactivated, downlink data is received from the first network node. If the Data Off indication indicates that the "Data Off" service is activated, no downlink data is received from the first network node.

In another embodiment, a user equipment for activating "Data Off" services using protocol configuration options is disclosed. The user equipment comprises a communication interface communicatively coupled to a processor. The communication interface and processor send a first indication to a first network node as part of the protocol configuration options. The first indication includes a Data Off indication indicating whether a "Data Off" service is activated. If the Data Off indication indicates that the "Data Off" service is deactivated, downlink data is received from the first network node. If the Data Off indication indicates that the "Data Off" service is activated, no downlink data is received from the first network node.

In yet another embodiment, a computer program product for activating "Data Off" services using protocol configuration options is disclosed. The computer program product comprises a non-transitory storage medium readable by a processing circuit and storing instructions for execution by the processing circuit for sending a first indication from a user equipment (UE) to a first network node as part of the protocol configuration options, the first indication including a Data Off indication indicating whether a "Data Off" service is activated. If the Data Off indication indicates that the "Data Off" service is deactivated, downlink data is received from the first network node. If the Data Off indication indicates that the "Data Off" service is activated, no downlink data is received from the first network node.

In still another embodiment, a method in packet data network gateway (P-GW) to activate "Data Off" services using protocol configuration options is disclosed. The method comprises receiving a first indication from a user equipment (UE) as part of the protocol configuration options. The first indication includes a Data Off indication indicating whether a "Data Off" service is activated. If the Data Off indication indicates that the "Data Off" service is deactivated, downlink data is sent to the UE. If the Data Off indication indicates that the "Data Off" service is activated, no downlink data is sent to the UE.

In another embodiment, a packet data network gateway (P-GW) for activating "Data Off" services using protocol configuration options is disclosed. The P-GW comprises a communication interface and a processor that send a first indication to a first network node as part of the protocol configuration options. The first indication includes a Data Off indication indicating whether a "Data Off" service is activated. If the Data Off indication indicates that the "Data Off" service is deactivated, downlink data is received from the first network node. If the Data Off indication indicates that the "Data Off" service is activated, no downlink data is received from the first network node.

In yet another embodiment, a computer program product for activating "Data Off" services using protocol configuration options is disclosed. The computer program product comprises a non-transitory storage medium readable by a processing circuit and storing instructions for execution by the processing circuit for receiving, at a packet data network gateway (P-GW), a first indication from a user equipment (UE) as part of the protocol configuration options. The first indication includes a Data Off indication indicating whether a "Data Off" service is activated. If the Data Off indication indicates that the "Data Off" service is deactivated, downlink data is sent to the UE. If the Data Off indication indicates that the "Data Off" service is activated, no downlink data is sent to the UE.

In still another embodiment, a method in an application server (AS) for activating "Data Off" services in a packet switched (PS) network using mobile terminated services is disclosed. The method comprises receiving a SIP METHOD message from a serving call session control function (S-CSCF). The SIP METHOD comprises uniform resource information (URI). A first Sh message containing the URI is sent to a home subscriber service (HSS). The first Sh message comprises a "Data Off" exempt services request. A second Sh message is received from the HSS. The second Sh message comprises values for the requested "Data Off" exempt services over the PS network. Whether the requested "Data Off" exempt services are allowed over the PS network is determined.

In another embodiment, a method in a network node to activate "Data Off" services using protocol configuration options is disclosed. The method comprises receiving, at the network node, an indication that "Data Off" has been activated; receiving, at the network node, a request for a downlink service; determining whether the downlink service is to be stopped; and if the service is to be stopped, stopping the downlink service.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
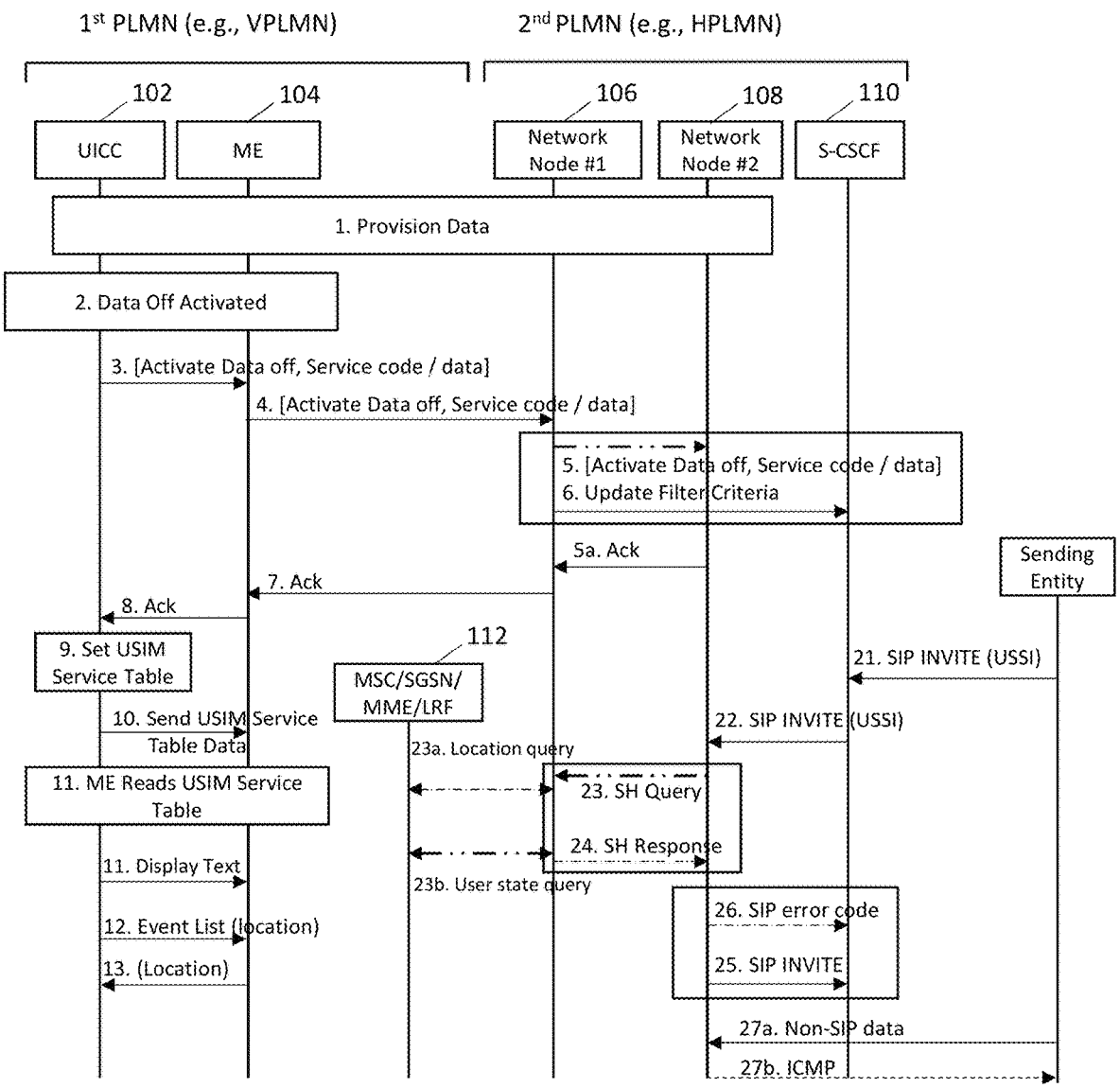
FIG. 1 is a flow diagram illustrating an example method for allowing a UE to enable and disable data services in a cellular device, in accordance with an example of the present disclosure.

1. System Environment 1.1 Data Off in a User Equipment (UE)

1.1.1 General

A UE is a device that can be wireless or use a fixed communication (e.g., Ethernet, etc.). The UE may or may not contain a Universal Integrated Circuit Card (UICC), accordingly a UE is sometimes referred to as an ME (Mobile equipment) and vice versa. UEs may have a user interface that allows the user to instruct the device to turn data transmission and/or reception "off" or "on" independent of voice (i.e. call origination and call termination) functionality. Most UEs today implement this data on/off selection feature for 2G/3G in one of two different ways:

a) UE activates an internal firewall and all outbound/mobile originated data traffic is stopped from being sent to the network; or b) UE deactivates/terminates/closes any PDP contexts etc. It should be noted that it is implementation specific which of the above options will be used by a 2G/3G device to disable data. Both options are generic Data Off mechanisms, meaning that in both circumstances the device stops all data being sent to the network's packet switched domain. However, there are now 4G and soon to be 5G operator services, such as voice (e.g., VoLTE), Unstructured Supplementary Service Data (USSD) and SMS that have packet-switched based data equivalents that are enabled by IMS.

Subscribers typically have different charging structures associated with different services, e.g., voice is time based, SMS is transaction based, while applications and browsing are data-quantity based. Disabling data has allowed subscribers to turn off data-quantity based services to allow the subscriber to reduce their bill, especially when roaming. This is especially true as applications, as soon as they have a data connection, start to communicate traffic without any interactions from the user.

To be considered with respect to item a) above is that the network is still able to send data packets to the device, which causes charging records to be created in the network.

1.1.2 Groundwork

In order to address issues identified in section 1.1.1, the foundations of a preliminary solution have been defined and are listed in Table 1 in the attached APPENDIX. The high-level provisions that follow are applicable for 3GPP access technologies including GSM EDGE Radio Access Network (GERAN), UTRAN and LTE:

1.2 Unstructured Supplementary Service Data (USSD)

USSD is a service that was originally specified in Phase 1 GSM for Mobile Originated (MO) operations and further enhanced in GSM Phase 2 to support Mobile Terminated (MT) USSD. USSD was initially designed to allow devices to be forward compatible. Supplementary service control can be performed using a known/specified Man-Machine Interface (MMI) procedure, which typically involves the user entering a sequence of numbers preceded and proceeded by one or more instances of one or both of a "*" symbol and/or a "#" symbol. The MMI procedures have syntax defined in 3GPP TS 22.030. However, it was envisaged that new supplementary services would be developed that the device may not understand. Therefore, USSD was developed such that if a MMI procedure was entered and the device did not recognize the sequence as a supported MMI procedure, the device would trigger a Mobile Originated (MO) USSD to be sent to the network containing the unrecognized sequence of numbers preceded and proceeded by one or more instances of one or both of a "*" symbol and/or a "#" symbol. The sequence of numbers for USSD have been defined such that some number ranges are specific to the VPLMN and some number ranges are specific to the HPLMN. Later, USSD was enhanced to allow transportation of application data. USSD can use non-access stratum (NAS) based signaling and IMS based signaling for transportation, the latter known as USSD over IMS (USSI).

1.3 Short Message Service (SMS)

SMS is a service that allows a device to send data to another device. SMS has a transport limit of 140 octets, however these messages can be concatenated together to form longer messages. The message originates from one UE (UEa) and is then sent to a Short Message Service Centre (SMS-C). SMS-C is a store and forward node that sends the message to the target UE (UEb). UEa and UEb do not necessarily have to be mobile devices. UEa and UEb can be fixed devices or even servers of some form. These later entities are more commonly known as Short Message Entities (SMEs). SMS was originally designed to work over cellular networks but was later adapted to IMS and is known as SMS over IP or SMS over IMS. A gateway is used to interwork cellular SMS to IMS SMS.

1.4 IP Multimedia Subsystem (IMS)

1.4.1 Basic Operations

In order for a Session Initiation Protocol (SIP) client (i.e. SIP user agent (UA)) to gain access to a network, the SIP client first performs a SIP REGISTRATION. This registration binds the identities provided in the SIP REGISTRATION message to a server, called a registrar, in the network. After performing this operation, which includes a step of authentication, the SIP UA can send or receive messages and/or data for various services. Most services will start with a SIP INVITE. Another way to provide service is via SIP MESSAGE.

1.4.2 Terminating Access Domain Selection (TADS)

TADS is a feature in IMS that determines how to route an IMS mobile terminated session. TADS is defined in 3GPP TS 24.292 where a new application server (see section 1.4.3) is defined called a Service Centralization and Continuity (SCC) AS. The SCC AS is able to query the Home Subscriber Service (HSS) to obtain possible location information (see Table 2 in the APPENDIX for CS example) where the UE might be, for example, LTE, CS, WiFi, etc. In addition to the examples shown in Table 2, location information may be one or more of, but not limited to:
  Routing Area ID: defined in 3GPP TS 23.003
  GPS co-ordinates
  ServiceProvider
  Service Provider ID
  Address
  Waypoint
  Network Node address e.g. VLR Number: defined in 3GPP TS 23.003, MSC Number: defined in 3GPP TS 23.003, etc.
  WLAN provided location (in UE that has WLAN capability)
Multiple locations could be requested and or reported. Age of the location can also be included. Based on the location of the UE and other information that is defined in 3GPP TS 23.221, TADS can make a decision regarding how to route a call.

1.4.3 Application Server (AS)

An Application Server in the IMS network allows an operator to deploy services without impacting core IMS elements. Application Servers can contain custom logic to perform numerous actions. An Application Server can act as a Back to Back User agent (B2BUA) that allows the AS to terminate the SIP Dialogue and create a new one linked to the terminated one. An AS can query the HSS for more information that the AS can then use to determine how to execute the custom logic. This query is performed over the Sh interface as defined in 3GPP TS 29.328 and allows the AS to obtain data defined in Table 3 in the APPENDIX.

1.5 SIM Toolkit

The SIM Toolkit is a set of commands supported by the Universal Integrated Circuit Card (UICC) to enable applications on the UICC to obtain data from a mobile equipment (ME) and request the ME to perform actions on behalf of the UICC application. UICC information may be either on a removable module or in internal memory. The UICC contains applications or profiles that are used by the UE and might contain an XCAP client. Some known applications are a Universal Subscriber Identity Module (USIM), and an IP Multimedia Services Identity Module (ISIM).

The set of commands supported by SIM Toolkit allows the following capabilities to be supported:
  Providing Local information, e.g., Cell ID: The SIM Toolkit application can request local information from the ME, e.g., current location which could be a Cell ID
  Call control: The SIM Toolkit application can request that for all call control activities, e.g., MO, MT calls, etc., the SIM Toolkit application gets information by the ME regarding the call prior to the establishment of the connection, e.g., to determine if the call should be allowed, modified or rejected.

IMS communication establishment: Same as Call control but for IMS communications.

Call control on EPS PDN connection: Same as Call control but for data session establishment, termination, etc.

MO SMS control by USIM: Same as Call control but for SMS.

SIM Toolkit also provides an application the opportunity to request notification of specific events by the ME. This request is called a SET UP EVENT LIST command with some events being: change of (radio) access technology, user activity, call being connected or disconnected, or status of the UE (e.g., in limited service state, normal service state, or no connection). Table 4 in the APPENDIX shows the states that are returned to the application.

In order for the ME to know that the above capabilities are supported by the UICC, there is a file in the USIM application that identifies which capabilities are present on the UICC. The file is $EF_{UST}$ (USIM Service Table) and is defined in 3GPP TS 31.102.

1.6 Protocol Configuration Options (PCO)

PCO is a general name given to a capability that was first used in General Packet Radio Service (GPRS). PCO allows a UE, via indicators (wherein an indicator can consist of one or more bits or even the absence of one or more bits in a message) sent to the network, to indicate to the network information that the UE requires. The network then responds back to the UE with that information. The request and response mechanism is called PCO. This capability was later extended to Universal Mobile Telecommunications System (UMTS)/UTRAN, Evolved Universal Terrestrial Radio Access Network (E-UTRAN)/LTE and Wireless Local Area Network (WLAN) networks. Configuration options that a UE can request and is provided with are described in 3GPP TS 24.008 subsection 10.5.6.3 (e.g., UE IP address(es), P-CSCF address(es), network-based IP flow mobility (NBIFOM) mode, IP Flow Mobility (IFOM) support, etc.). In 2016, (C1-163131), PCO has been extended further to allow the PCO information element to carry more than 253 octets. This new extended PCO (ePCO) will be used by narrow band Internet of Things (NB-IoT) devices.

The PCO information element is defined in 3GPP TS 24.008 subclause 6.1.3.7, 3GPP TS 24.301 subclause 6.6.1 and 3GPP TS 24.302 subclause 6.9 and 6.4.3.5.2. The transport of the PCO between network entities in GPRS Tunneling Protocol (GTP) is defined in 3GPP TS 29.060 (for 2G/GERAN and 3G/UMTS/UTRAN systems) and 3GPP TS 29.274 (for LTE/EPC/E-UTRAN systems). In 3GPP access, (e.g., GERAN, UTRAN, E-UTRAN), the PCO information for a response to a requesting UE comes from a Gateway GPRS Support Node (GGSN) or Packet Data Network Gateway (P-GW). The GGSN or P-GW can be located in the VPLMN or HPLMN.

1.7 Policy Control and Charging (PCC)

PCC provides access, resources, and quality-of-service (QoS) control. The PCC architecture allows an operator to determine if service requests should be allowed or denied while allowing the operator to allocate specific resources when the service request is allowed. The architecture allows services to be terminated or modified at any time. PCC is an optional deployment in a wireless network.

1.8 XML Configuration Access Protocol (XCAP)

XCAP is an application layer protocol that allows a client to read, write, and modify application configuration data stored in EXtensible Markup Language (XML) format on a server. XCAP uses HTTP as a transport and as is defined in RFC 4825. XCAP is used in the 3GPP system to allow a device (UE) to configure supplementary service behaviour (e.g., set up call forwarding, active call forwarding, deactivate call forwarding, etc.).

2. Solutions

A number of solutions for allowing a UE to enable and disable data services (referenced correspondingly herein as "disable Data Off" and "enable Data Off" are presented in this section. Additionally, solutions are provided to allow the UE and the network to enforce "Data Off" for some data services, yet allow other data services, e.g., enable uplink and downlink data traffic for one or more telephony-type services provided over LTE (e.g., via IMS), while preventing uplink and downlink data traffic for all other data services on LTE. Numeric values and names are provided for illustrative purposes and should not be taken as absolute values. The terms "UE," "ME" and "device" are used interchangeably throughout this specification to denote a wireless electronic device.

2.1 Concise Overview

2.1.1 Enabling and Disabling "Data Off"

In this solution, the UICC includes an application that, using mechanisms on the ME that are transparent (i.e. are not specific to "Data Off"), receives an indication that "Data Off" is desired for this UE. Accordingly, the ME (in cooperation with the UICC) transmits to the network an indication that "Data Off" is to be enabled for this UE.

In some solutions, the UICC application sends (via the ME) this "Data Off" indication via the network to a Home Subscriber Server (HSS) using transport protocols that are routed directly/transparently to the HPLMN. The HSS is also known as a Home Location Register (HLR). The HSS/HLR contains data that is specific to a User identity, for example, services that the User identity has subscribed to, are active, inactive, location information of the subscriber, etc. In some implementations, the HSS/HLR also contains information that allows a User identity to be authenticated. Specific examples of HSS/HLR are defined in 3GPP specifications.

In other solutions, the application sends this "Data Off" indication via the network to the GGSN/P-GW in the HPLMN using PCO as part of a procedure to activate or modify an ongoing Packet Data Protocol (PDP) context and/or Packet Data Network (PDN) connection.

2.1.2 Enforcement of "Data Off" in the UE

In the UE, the enforcement of "Data Off" for mobile originated services is achieved as follows: The UICC reconfigures itself, e.g., the "Data Off" application on the UICC, and informs the ME. Once the ME attempts to initiate an IMS service, the ME informs the UICC (e.g., using the request-URI message). The UICC makes a determination as to whether the service is permitted, modified or rejected, using SIM toolkit mechanisms. The UICC may reconfigure itself after receiving an acknowledgement from the network.

2.1.3 Enforcement of "Data Off" in the Network

In the network, the enforcement of "Data Off" for mobile terminated services depends on whether there is a new session, see 2.1.3.1, or an ongoing session, see 2.1.3.2.

2.1.3.1 New Sessions

Option 1: The HSS receives an indication from the UE that "Data Off" is desired in respect of a User identity. An application server, receiving a request for a mobile terminated data session, queries the HSS. (It should be noted that a data session can also be a service description and vice versa). The query includes at least the service description. A service description consists of a set of parameters that describes at least a data session. The HSS evaluates the query and may transmit a response. Based on the response (which may include no response) the application server permits, modifies or rejects the mobile terminated request.

Option 2: If the P-GW/GGSN is informed of the enablement/activation of Data Off for the UE, the P-GW/GGSN stops sending downlink traffic to the UE.

2.1.3.2 Ongoing Sessions at the Time Data Off is Enabled

When Data Off is activated, the HSS sends an indication containing the user identity to the Application Server. If there is an ongoing session in the Application Server for that User identity, the Application Server will perform the actions for the Application Server as described in section 2.1.3.1.

2.1.4 Termination via the CS Domain

An Application Server (AS) may determine that a requested service/data session which is not permitted via the packet switched (PS) domain due to a "Data Off" restriction may be terminated via the CS domain. In this case, the Application Server forwards the SIP METHOD (containing Request URI) via intermediary nodes to an MSC server to enable the service to be terminated via the CS domain. If the CS domain is not available, the service may either be rejected or forwarded to a third entity, e.g., voice mail, C party, etc.

2.2 Enabling and Disabling "Data Off" in the UE and Network

Solutions described below address how the UE can instruct the network to disable data services for the UE (i.e. "enable Data Off") and enable data services (i.e. "disable Data Off"). Specific examples address the activation of the "Data Off" service. Similar or counterpart functionality can be used to deactivate the "Data Off" service. FIG. 1 provides a diagrammatic view 100 of the methods described below. Steps of the overall process of FIG. 1 are described below from the perspective of each component in the process.

2.2.1 UICC Behavior

An application on the UICC 102 causes the following behavior. The UICC 102 may send a SET UP EVENT LIST command containing an indication of one of: Location status and a PROVIDE LOCAL INFORMATION.

At step 1, the system is optionally provisioned with Provisioned services for Data Off. Provisioned services for Data Off is a list/set of Service Descriptions that indicate services that are exempt or not exempt when Data Off is activated. The list could be formatted such that they are on a per "Location information" basis. Whether or not a service described by a Service Description is exempt could be indicated implicitly (e.g., by its inclusion in the list), or there could be an explicit indication for each Service Description. Service Descriptions may be, for example, a combination of:
   Enumerated;
   IMS Communication Service Identifier (ICSI);
   IMS Application Reference Identifier (IARI);
   Full or partial Session Description Protocol (SDP) description;
   SIP Method (INVITE, MESSAGE, REFER);
   Feature tags;
   Uniform Resource Locator (URL);
   Access Point Name (APN);
   Protocol (SIP, Transmission Control Protocol (TCP), User Datagram Protocol (UDP), Hypertext Transfer Protocol (HTTP), etc.); and
   Content type.
Multiple Service Descriptions may be requested and/or reported.

At step 2, the UICC 102 receives an indication that "Data Off" is to be activated (e.g., via a manner transparent to the ME 104, such as the SIM toolkit). At step 3, the UICC 102 sends a first indication to the ME 104 indicating that "Data Off" is to be activated and optionally includes any of: Provisioned services for Data Off, Location information, Data Off indication, and User identity. The first indication may be, but is not limited to, one of a USAT: SEND MESSAGE or a SEND Short Message.

Possible types of Location information are listed in Table 2 and section 1.4.2. A Data Off indication is a flag/indication/status that indicates to the network that "Data Off" has been activated or deactivated. The Data Off indication could be, but is not limited to:
   a bit;
   a collection of bits;
   a byte;
   a feature tag;
   a "*#" sequence/code;
   a SIP Uniform Resource Identifier (URI); or
   a TEL URI.
There may be separate values for "Active" and "Inactive."

The User identity can be either or both a Public User ID and a Private User ID. A Public User ID could be, but is not limited to: an MSISDN, an email address, a SIP URI, a Tel URI, a Network Access Identifier (NAI), etc. A Public User ID is known to the public. A Private User ID may be, but is not limited to: an International Mobile Subscriber Identity (IMSI), a SIP URI, an NAI, etc. A Private User ID is known to the network and the device.

Returning to FIG. 1, at step 8, the UICC receives a second indication from ME 104 indicating that "Data Off" has been successfully activated (i.e. Ack). Also at step 8, UICC 102 may optionally receive Provisioned services for Data Off which is stored on the UICC, e.g., in a UICC application. The second indication could be, but not limited to:
   USSD related signaling;
   SMS related signaling;
   NAS signaling messages, e.g., 3GPP TS 24.008 messages [Activate PDP context accept, Activate PDP context reject, Activate Secondary PDP Context Accept, Activate Secondary PDP Context Reject, Request PDP context activation, Modify PDP context request, Modify PDP context accept, Modify PDP context reject, Deactivate PDP context request, Deactivate PDP context accept, Request secondary PDP context activation], 3GPP TS 24.301 messages [Activate default EPS bearer context request, Activate dedicated EPS bearer context request, Modify EPS bearer context request, Modify EPS bearer context reject, Bearer resource allocation reject, Bearer resource modification reject, Deactivate EPS bearer context request, Modify EPS bearer context reject, Modify EPS bearer context request, PDN connectivity reject, PDN disconnect reject, ESM information request];

PCO in any of the NAS signaling messages;

SIP signaling, e.g., 200OK; and

HTTP e.g., 200 ok.

Alternatively, if the UICC 102 determines that the ME 104 is in LIMITED Service state (i.e. Location status value '01' is returned), and the UICC 102 can obtain the location of the ME 104 by receiving a response, e.g., to PROVIDE LOCATION INFORMATION (e.g., location information such as the mobile country code (MCC), mobile network code (MNC), location area code/tracking area code (LAC/TAC) and cell ID of the current serving cell, WLAN Specific Identifier, etc.), then the UICC 102 performs step 9 onwards using the location information received. Upon moving out of (i.e. not being in) LIMITED service state ('00' Normal service), the UICC 102 returns to step 3 above.

At step 9, the UICC 102 sets services in the Universal Subscriber Identity Module (USIM) Service table. The set of services in the USIM table could be any of the following:

USIM Service no30 "available" (Call control by USIM)

USIM Service no31 "available" (MO-SMS control by USIM)

USIM Service no93 "available" (Communication Control for IMS for USIM)

USIM Service no87 "available" (Call control on EPS PDN connection by USIM)

At step 10, the UICC 102 sends a third indication to the ME 104 containing information from the USIM Service Table. The third indication may contain, for example, the command USAT: REFRESH.

Optionally any one or more of the following can occur. At step 11 the UICC 102 sends a fourth indication to the ME 104. The fourth indication contains text to be displayed, wherein the text is an indication that some services are exempt from "Data Off" activation. This text could be a free format text field. The field can be used to display text on the screen of the device. Displaying text assists the user in determining that "Data Off" has been activated and which services are exempt.

At step 12, the UICC 102 may also send a fifth indication to the ME 104. The fifth indication is a request that the ME 104 inform the UICC 102 of a location change or a SET UP EVENT LIST command containing an indication of at least one of: Location status; Access Technology Change (single access); Access Technology Change (multiple access).

At step 13, if the UICC 102 receives an additional indication from the ME 104, the UICC 102 could repeat the process beginning at step 3. This additional indication contains an indication that the location has changed, wherein the indication could be the actual location. The UICC 102 might perform the repeating of steps 3 through 12 depending if exempt services have changed due to change in the UE's location wherein location is cell, PLMN, or RAT change.

2.2.2 ME Behavior

Referring once again to FIG. 1, the ME 104 is optionally provisioned or otherwise configured with Provisioned services, at step 1. For example, the ME 104 stores a data structure (e.g., table, list, etc.) of Provisioned services. At step 3, the ME 104 optionally receives the first indication from UICC 102 that "Data Off" is to be activated and optionally includes any of: Provisioned services for Data Off, Location information, Data Off indication and User identity.

At step 4, the ME 104 sends a seventh indication to the network that "Data Off" is to be activated optionally including any of: Provisioned services for Data Off, Location information, Data Off indication and User identity. The seventh indication may be, but not limited to:

USSD related signaling;

SMS related signaling, e.g., CM service request;

NAS signaling messages, e.g., 3GPP TS 24.008 & 3GPP TS 24.301 messages such as: Attach request, 3GPP TS 24.008 messages, Activate PDP context request, Activate Secondary PDP context request, Modify PDP context request, Modify PDP context accept, Modify PDP context reject, Deactivate PDP context request, Deactivate PDP context accept, Request PDP context activation reject, Request secondary PDP context activation reject, etc.;

3GPP TS 24.301 messages such as Activate default EPS bearer context accept, Activate default EPS bearer context reject, Activate dedicated EPS bearer context accept, Activate dedicated EPS bearer context reject, Bearer resource allocation request, Bearer resource modification request, Deactivate EPS bearer context accept, Modify EPS bearer context accept, Modify EPS bearer context reject, PDN connectivity request, PDN disconnect request, ESM information response, etc.;

PCO in any of the above NAS signaling messages;

SIP signaling, e.g., SIP INVITE, SIP REGISTER; SIP INFO; and

HTTP e.g., PUT.

The seventh indication may be received for the network by network node #1 (NN1) 106. NN1 106 may be an HSS, a GGSN, an Evolved Packet Data Gateway (ePDG), a P-GW, UPF, an S-CSCF, an Application Server, an XCAP Client, XCAP Server, etc. At step 7, the ME 104 receives an eighth indication from NN1 106 that indicates "Data Off" has been successful (i.e. Ack). The eighth indication could be, but not limited to, USSD related signaling and/or SMS related signaling.

Optionally any of the following can occur:

At step 8, ME 104 sends the second indication to the UICC 102 indicating that "Data Off" has been successfully activated (i.e. Ack).

At step 10, the ME 104 receives the third indication from UICC 102 containing information from the USIM Service Table, and reads the USIM Service table.

At step 11, the ME 104 receives the fourth indication from UICC 102 containing text to be displayed.

At step 12, the ME receives the fifth indication from UICC 102 containing a request that the ME 104 inform the UICC 102 of a location change.

At step 13, upon detecting the event as specified in step 12, the ME 104 sends the information to the UICC 104 in the sixth indication.

2.2.3 Network Node 1 Behavior

Referring once again to FIG. 1, optionally, either on a per User identity basis or for all user identities, NN1 106 is provisioned or otherwise configured with data to indicate which services are exempt from "Data Off" and/or which services are included in "Data Off" (known hereafter as "Provisioned services for Data Off"). In other words, the provisioning or configuration indicate which services the user can still use when "Data Off" is activated.

Beginning at step 4, NN1 106 receives the fourth indication showing that "Data Off" has been activated. The fourth indication may optionally include any of: Provisioned services for Data Off, Location information, Data Off indication and User identity. NN1 106 marks the Provisioned services for Data Off as the services that the User identity is allowed to use and that all other services are prohibited. In other words, the User identity can set-up calls/sessions/send messages/etc. for services that are allowed while "Data Off" is active. However, it should be noted that "Prohibited" can also mean that the service will be forwarded.

From this point, NN1 106 may perform one of three sets of options. First, NN1 106 may only perform step 7, in which NN1 106 sends the eighth indication to ME 104, which acknowledges that the operation was successful and optionally includes Provisioned services for Data Off. The set of services could be based on the Location information received in step 4. Second, NN1 106 may send a ninth indication that "Data Off" has been activated to network node #2 (NN2) 108, at step 5. The ninth indication may be, but not limited to messages used for tunnel management such as:

- GPRS Tunneling Protocol (GTP) messages, e.g., such as 3GPP TS 29.060 messages [Create PDP context request, Create PDP context response, Update PDP context request, Update PDP context response, Delete PDP context request, Delete PDP context response];
- 3GPP TS 29.274 messages [Create session request, Create bearer response, Bearer resource command, Modify bearer request, Delete session request, Delete bearer response, Update bearer response, Delete bearer command, PMIP messages];
- PCO, e.g., in any of the GTP messages signalling messages; and
- SIP 3rd party REGISTRATION.

NN2 108 may be or perform the function of an HSS, an Application Server (e.g., SCC AS, Telephony Application Server (TAS), etc.); authentication, authorization and accounting (AAA) server; policy and charging rules function (PCRF); an XCAP Server, etc. It should be noted that NN1 106 and NN2 108 can be co-located as one function and/or interchange roles. The ninth indication optionally includes any of: Provisioned services for Data Off Location information, Data Off indication and User identity. NN1 106 then sends the eighth indication, at step 7, to the ME 104 acknowledging that the operation was successful and optionally including Provisioned services for Data Off. The set of services could be based on the Location information received in step 4.

Third, after receiving the seventh indication, at step 4, NN1 106 sends, at step 6, a tenth indication to the Serving Call Session Control Function (S-CSCF) 110, wherein the tenth indication includes filter criteria containing the services that are exempt/not exempt from "Data Off." The filter criteria will be such that services that are exempt are routed to an Application Server. NN1 106 then sends, at step 7, the eighth indication to ME 104 that acknowledges the operation was successful and optionally includes Provisioned services for Data Off. The set of services may be based on the Location information received in step 4.

2.2.4 Network Node 2 Behavior

Referring once again to FIG. 1, at step 5, NN2 108 receives the ninth indication from NN1 106. The ninth indication may include any of the following: Provisioned services for Data Off, Location information, Data Off indication and User identity. At step 5a, NN2 108 sends an eleventh indication to NN1 106 acknowledging that the operation was successful and optionally including Provisioned services for Data Off.

2.3 Enforcing "Data Off"

2.3.0 Summary

NN2 108 receives indication of mobile-terminated communications; sends a request comprising User identity, Location information, service type, to NN1 106 to determine whether these communications should be permitted; receives a response, and permits (or not) traffic accordingly.

2.3.1 UICC Behavior

The UICC 102 determines the PLMN. The UICC 102 either has this information stored or requests the location of the ME 104 using a Universal Subscriber Identity Module Application Toolkit (USAT) command "PROVIDE LOCAL INFORMATION" and contains an indication that location information is required. Upon determining the location of the ME 104, the UICC 102 determines if there is an entry for that PLMN, the Country Code (CC) that matches the CC of the attached PLMN or "Any_PLMN" in Provisioned service for Data Off. It should be noted that "Any_PLMN" may also mean that there is no PLMN/Location information stored. If there is an entry in Provisioned services for Data Off, the UICC 102 determines if there is a Service Descriptions entry that matches the service being requested. If the service is allowed or there is no entry, the UICC 102 allows the service to proceed. If the service is not allowed, the UICC 102 terminates the service and optionally provides an indication (e.g., at steps 11 or 12 of FIG. 1).

If there is a service in progress, the UICC 102 may issue USAT SET UP EVENT LIST command to the ME 104 containing an indication of one of: Location status; Access Technology Change (single access); Access Technology Change (multiple access). If the UICC 102 receives a response from the ME 104 while the service is in progress, the UICC 102 may take the response into account in determining if the service is to be terminated.

2.3.2 ME Behavior

If "Data Off" has been activated, and if the ME 104 is attached to the PLMN, then the ME 104 determines if there is an entry for the attached PLMN in Provisioned services for Data Off, (e.g., The Mobile Country Code (MCC) and Mobile Network Code (MNC) of that attached PLMN matches either an entry in Provisioned services for Data Off that contains the same MCC, MNC or there is an "Any_PLMN" entry in the Provisioned services for Data Off). If there is an entry in Provisioned services for Data Off for the attached PLMN, and if there is a Service Description entry that matches the service being requested, the ME 104 will determine if the service is allowed or there is no entry, and if so, allow the service to proceed. However, if the service is not allowed, the ME 104 terminates the service and optionally provides an indication. If the functionality is implemented on the UICC 102, then the ME 104 will perform procedures as defined in 3GPP TS 31.111.

2.3.3 Behavior of Network Node 1 (e.g., HSS)

Returning to FIG. 1, at step 23, NN1 106 receives a request from NN2 108 to determine if "Data Off" is active for a User identity. At step 23a, NN1 106 optionally performs a location query to MSC/SGSN/MME/LRF 112 to determine the location of the ME 104. At step 23b, NN1 106 optionally performs a user state query to MSC/SGSN/MME/LRF 112. At step 24, NN1 106 sends an indication containing Provisioned services for Data Off to NN2 108.

Alternatively, at step 23, NN1 106 receives a request from NN2 108 that includes Service Descriptions for a User identity. At step 23a, NN1 106 optionally performs a location query to MSC/SGSN/MME/LRF 112 to determine the location of the ME 104. At step 23b, NN1 106 optionally performs a user state query to MSC/SGSN/MME/LRF 112. At step 24, NN1 106 sends an indication. At step 24, NN1 106 sends an indication determining whether the Service Description is allowed or not. It should be noted that lack of data or explicit indication can imply the service(s) are allowed.

In the above, in steps 23, 23a and 23b there may be a request for location information, wherein the request could contain an indication of the type of location information. In step 24, if a location information request was received in step 23, the location information shall be included.

2.3.4 Behavior of Network Node 2 (e.g., AS)

Referring once again to FIG. 1, at step 22, NN2 108 receives an indication for a mobile terminated service from an S-CSCF 110. Optionally, at step 23, NN2 110 sends an indication to NN1 106 containing User identity and optionally a Service Description, a request for location information for the User identity and/or User state information.

At step 24, NN2 108 receives an indication from NN1 106 containing at least one of: Provisioned services for Data Off, an indication if the service is allowed or not, Location information, User state information and/or Network Node address (e.g., for IP Short Message (IPSM) GW or Universal Supplementary Service Data using IP (USSI) GW). It should be noted that lack of data of explicit indication can imply the service(s) are allowed. NN2 108 further determines if the service received in step 24 should be terminated, or routed to be attempted to be completed in PS or CS.

NN2 108 may also, upon determining the service is not "Data Off" exempt, if there is an equivalent service in the CS domain, at step 25, perform the following steps:

Set the R-URI of the SIP METHOD to be that of a network node 3 (NN3) (not shown). NN3 may be a USSI Server, MSC Server, Media Gateway, IPSM GW, etc.

Forward the SIP METHOD to another SIP UA and optionally send a notification of the forwarding to any or all of: A party (i.e. the originator of a service), B Party (i.e. the intended recipient of the service A wanted to reach), C party (i.e. a party that was chosen to receive the service that A originated).

If no equivalent service exists in the CS domain or NN2 108 decides not to terminate the service in the CS domain e.g., ME does not have CS access, send, at step 26, a SIP Error.

If the service can be partially accepted, NN2 108 may send an SDP answer including the acceptable service description and/or receive an SDP offer. If the offer is acceptable, the NN2 108s include the SDP offer in the outgoing SIP METHOD. CS access could be determined by type of location information or user state information returned. A request for location information could include a request for specific location information (e.g., using CS, 3G, LTE, WLAN, etc.).

As an alternative to the above procedure, NN2 108 may, upon receipt of any of Provisioned services for Data Off, Location information, Data Off indication or User identity, at step 5, stop sending any data to the User Identity. Depending on the type of data that is stopped being sent by the sending entity, at step 26, if data is SIP, the NN2 108 may send a SIP error (e.g., 488 or 415); or, in case of 415 error, the list of media types that are acceptable would correspond to those received in the Provisioned services for Data Off or, at step 27a, if data is non-SIP (e.g., HTTP, etc.), NN2 108 may send an Internet Control Message Protocol (ICMP), at step 27b. Alternatively, if Session is already in progress (e.g., SIP dialogue exists), NN2 108 may perform steps 23 and/or step 24 described above.

3. Proposed Solution(s)—Details

The proposed solutions below can be combined. One combination is that if the sending of the USSD fails (e.g., at step 5 of FIG. 1, error code is received or no response) solution in section 2.2 could then be invoked. Furthermore, other possible combinations are possible. For example, in a USSD solution, if the acknowledgement does not come back or an error is returned, the ME may send a SIP REGISTER containing the data that the USSD message contained (e.g., Data Off indication).

3.1 Enabling and Disabling Data Off in the UE and Network

The solutions described in this section address the problem of how the UE can instruct the network to enable "Data Off" for the UE while enabling certain data services.

3.1.1 Solution #a: Activation/Deactivation of Data Off using USSD

Figure 2:
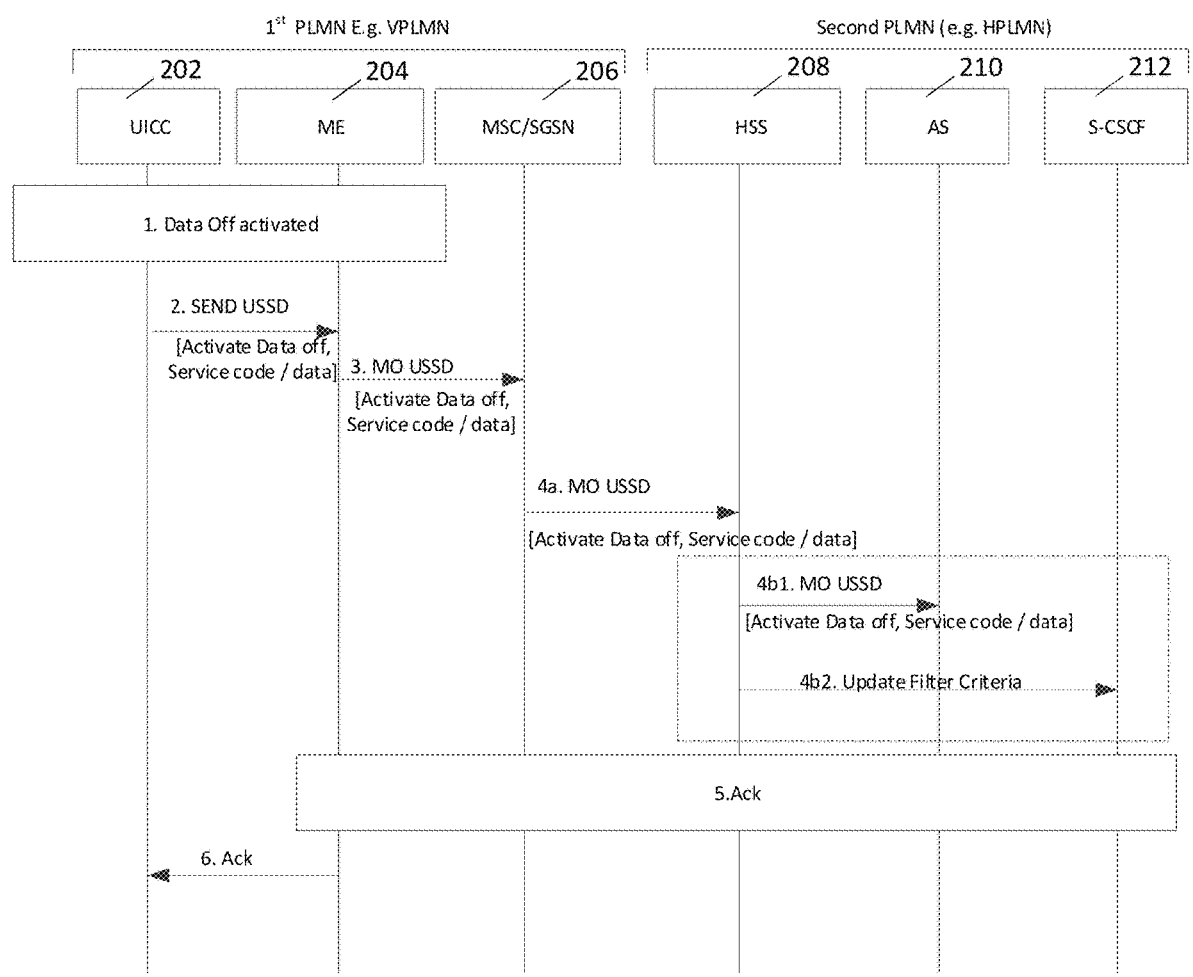
FIG. 2 is a flow diagram illustrating one method of activating/deactivating "Data Off" using mobile originating Unstructured Supplementary Service Data (USSD), in accordance with an example of the present disclosure.

FIG. 2 is a diagrammatic view of one example method of using mobile originating USSD to activate/deactivate "Data Off" services in accordance with the present disclosure.

At step 1, the UICC application 202 receives an indication from an application on the ME 204 or a (U)SIM Toolkit application that "Data Off" features are to be activated. The UICC 202 sends a SET UP EVENT LIST message to the ME requesting "Location Status". If a Location Status of "02" (No service) is returned, no action is taken. If a Location Status of "01" (Limited service) is returned, the UICC 202 sends the ME 204 a PROVIDE LOCAL INFORMATION (Command details=value 00) indication to indicate that Location information is required. According to 3GPP TS 31.111, the response may include any of: the mobile country code (MCC), mobile network code (MNC), location area code/tracking area code (LAC/TAC) and cell ID of the current serving cell. The UICC 202 compares the response, that contains the location data, with location information that is stored in the Provisioned services data structure (e.g., Table 7 in the APPENDIX contains FIG. 1—Service Description data model which is an example data structure. Within the data structure, there is the "Location" leaf that can have MCC, MNC, LAC, TAC, CellID). If there is a location match (e.g., if the PLMN ID, comprising the MNC and MCC, in both the data structure and the location information received from the ME 204 is the same), the UICC 202 determines which services are exempt by reading the corresponding Service Descriptions leaf, and initiates mobile-originated enforcement (see section 3.2.2). If the UICC 202 receives an indication from the ME 204 that the ME 204 is in Normal state (i.e. Location status '00'=Normal service) the UICC 202 proceeds as above for the case where Location status is '01'. If the UICC 202 receives an indication from the ME 204 that the ME 204 is in Normal state (i.e. Location status '00'=Normal service) the UICC 202 proceeds as above for the case where Location status '01' is returned, and continues with step 2.

At step 2, the UICC 202 and/or an application on the UICC 202 sends a SIM Toolkit SEND USSD message containing a Data Off indication. This indication is a *# sequence that is processed in the HPLMN and identifies the set of Provisioned services for Data Off, listed as enumerated values. An example USSD command is provided in Table 5 in the APPENDIX. It should be noted that, provided that the sequence complies with the requirements in 3GPP TS 22.030 for a HPLMN-processed code, the syntax of the code need not be standardized, but could be determined by the HPLMN operator (who has control of both the UICC application and the HSS 208). The ME 204 receives the USSD message containing the indication sent by the UICC 202.

At step 3, the ME 204 forwards the USSD message containing the indication as received in step 2, to the network, e.g., the MSC/SGSN 206. If the ME 204 is currently camped on LTE, the UE first performs CS Fallback as described in 3GPP TS 23.272 to UTRAN or GSM/GPRS. The MSC/SGSN 206 receives the message and analyses the *# sequence received in the USSD message from the UE and determines from the *# sequence that the USSD message is to be routed to the HPLMN.

At step 4a, the MSC/SGSN 206 sends a MAP USSD message to the HSS 208. The MAP USSD message includes the IMSI. Alternatively, if the ME 204 is camped on LTE, the ME 204 may send the message using the USSI service over LTE to the USSI AS (which is part of the HSS 208 functionality).

At step 4b1, the HSS 208 receives the message sent in step 4a and sends a message via the Sh interface to the AS 210 responsible for processing "Data Off" notifications (e.g., the SCC AS). The message contains:
 the User identity (in the form of an IMS Public User Identity; if the HSS 208 received the message from an MSC 206, this is the IMS Public User Identity associated with the IMSI);
 The Data Off indication (indicating whether Data Off is activated or de-activated); and
 Provisioned services for Data Off.
See Table 3 for example changes to message on the Sh interface for Data Off indication and Provisioned services for Data Off.

The HSS 208 updates the profile associated with the IMSI that was sent in step 3. If the Data Off indication indicates Activated (i.e. *10*1#), then the services that are exempt from Data Off service are marked as permitted. Other services are marked as prohibited over PS. If the Data Off indication indicates Deactivated (i.e. *10*2#), then all services that are not exempt for the "Data Off" service are permitted for the IMSI.

At step 4b2, the HSS 208 sends a message to the S-CSCF 212 to initiate or disable mobile-terminated enforcement as appropriate (see section 3.2.1).

A USSD acknowledgement message is created at step 5, and transmitted from the HSS 208 to the UICC 202 (e.g., USIM 3GPP PS Data Off application), at step 6, via the ME 204 and MSC/SGSN 206 indicating that the 'Data Off' indication has been successfully processed. The UICC 202 indicates to the ME 204 to display text on the screen of the device to inform the user of the status of the 3GPP PS Data Off, and, optionally, the Exempt Services which are permitted when "Data Off" is enabled.

3.1.2. Solution #b: Activation/Deactivation of Data Off using SMS

Figure 3:
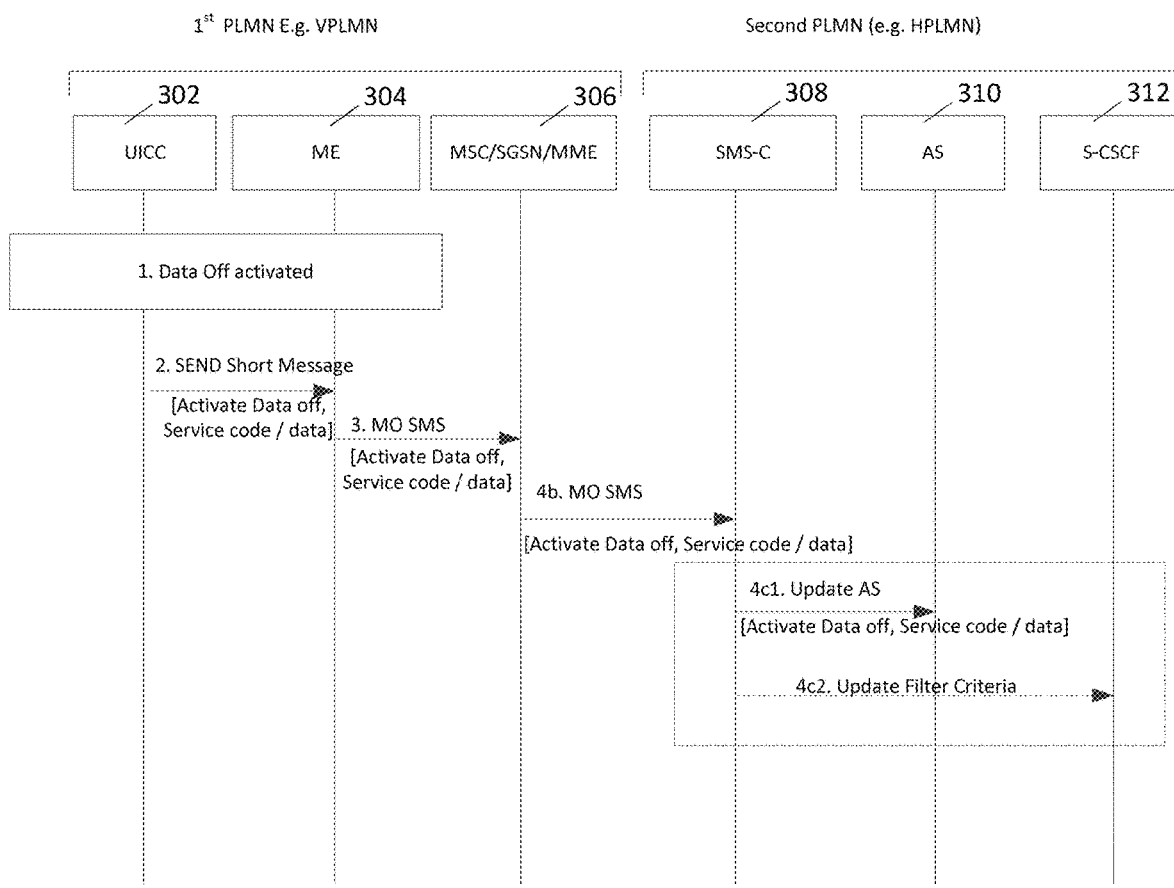
FIG. 3 is another flow diagram illustrating a method of activating/deactivating "Data Off" using mobile originating Unstructured Supplementary Service Data (USSD), in accordance with an example of the present disclosure.

This solution is similar to that described in section 3.1.1. The difference is in the transport signaling used to carry Provisioned services for Data Off, Location information, Data Off indication and User identity. Notable differences, shown in FIG. 3, include:

The UICC 302 and/or ME 304 might contain an SMS-C address to be used as the destination SMS-C address when SMS is used (in place of USSD as described in 3.1.1) to transmit Data Off-related information (such as Provisioned services for Data Off, Location information, Data Off indication and User identity). When an indication is received that "Data Off" is to be activated or deactivated, an SMS is constructed that contains Data Off-related information. If the Data Off SMS-C address is not present or the field is present but empty, then the existing SMS-C address from the UICC EFSMSP file shall be used to send the Short Message.

3.1.3 Solution #c: Activation/Deactivation of Data Off using PCO

3.1.3.1 At Time of Attach

Figure 4:
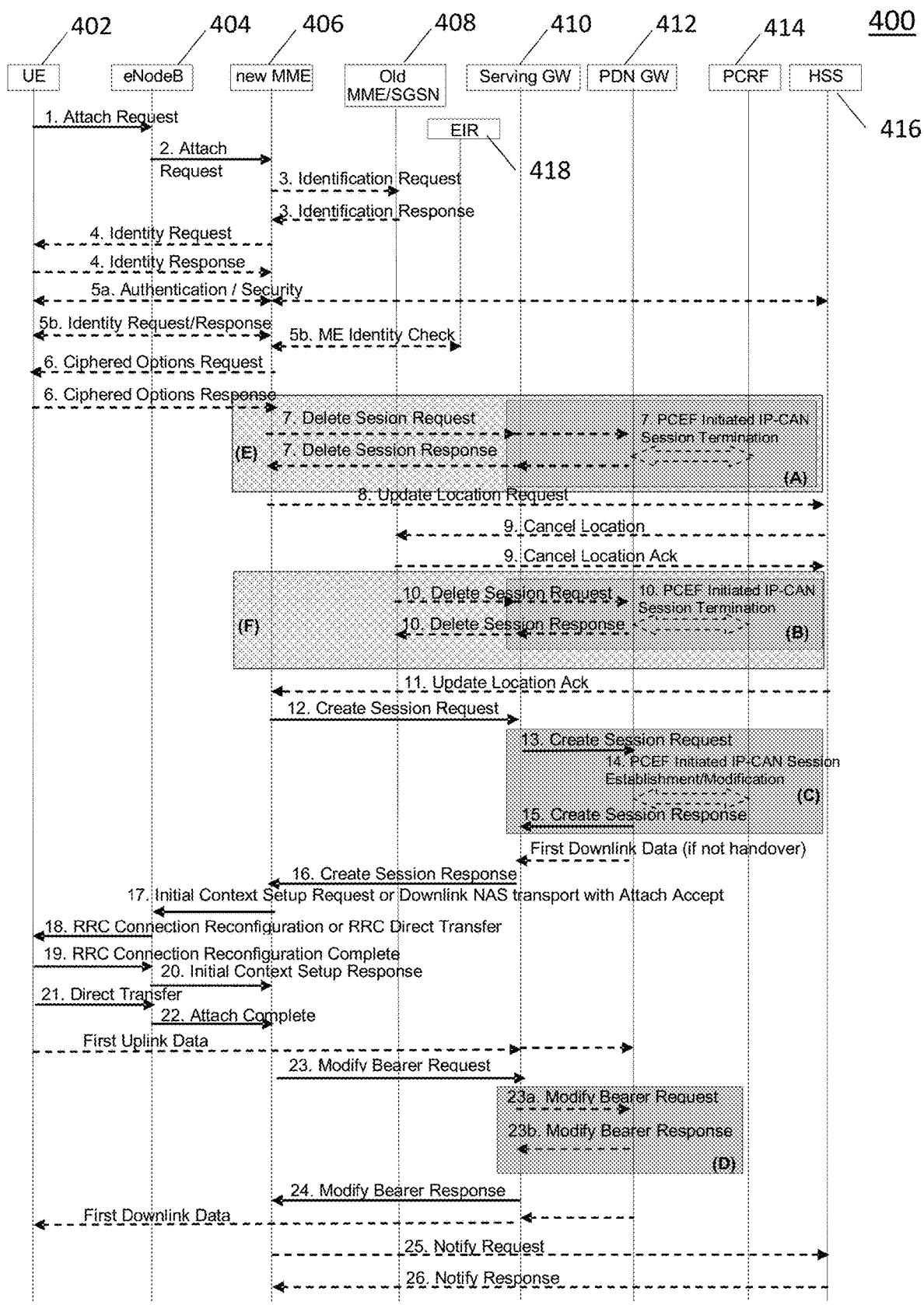
FIG. 4 is a flow diagram illustrating one method of activating/deactivating "Data Off" using Protocol Configuration Options (PCO) at the time of attach, in accordance with an example of the present disclosure.

If at the time of LTE/E-UTRAN attach, the UE is already in a state of/has activated "Data Off" (e.g., due to the UE roaming to a PLMN that is not the UE's HPLMN or an EHPLMN), then the UE can perform an EPS attach with a PDN connection as currently specified but indicate to the network that no downlink data is allowed/all downlink data is prohibited for the PDN connection(s) for the default EPS bearer by sending an indication to the P-GW e.g., by including an indication in the PCO information element. The flow diagram in FIG. 4 depicts this scenario.

At step 1, the UE 402 sends an Attach Request message to the MME 406 through eNodeB 404, which includes any of Provisioned services for Data Off, location information, Data Off indication and User identity. The data could be encoded as part of the Protocol Configuration Options (PCO).

Steps 2-11 are standard operations executed at the time of attachment and are not discussed in detail in this specification.

At step 12, the MME 406 sends the Create Session Request message to the selected Serving GW (SGW) 410, which includes the information sent in step 1 (e.g., as part of the Protocol Configuration Options (PCO)), as received from the UE 402.

At step 13, the Serving GW 410 sends the Create Session Request message to the PDN GW (P-GW) 412, which includes the information received in step 12 (e.g., as part of the Protocol Configuration Options (PCO)), as received from the MME 406. Based on the received information of the state of the activation of "Data Off", the PDN GW 412 performs one of the following:
 If Data Off indication indicates that "Data Off" is activated, then the PDN GW 412 does not send downlink data/packets to the SGW 410 for the User identity for the particular PDN connection. The PDN GW 412 shall either silent discard received packets/data from the PDN or return an appropriate error e.g. an ICMP error.

If Data Off indication indicates that "Data Off" is deactivated/not activated, then the PDN GW 412 sends downlink data/packets to the SGW 410 for the User identity for the particular PDN connection.

The above solution is described in terms of the UE; however, similar to the solution described in section 3.1.1, an application on the UICC 402 could be used. The UICC 402 has the following services set in the USIM Service table:

USIM Service no87 "available" (call control on EPS PDN connection by USIM)

USIM Service no54 "available" (call control on GPRS by USIM)

When an indication is received that "Data Off" is to be activated, if an Evolved Packet System (EPS) PDN or PDP context is active, the application (i.e. UICC 402) sends a context modify command to the ME. The PCO of the context modification shall contain an indication that "Data Off" has been activated.

3.1.3.2 While Attached

Figure 5:
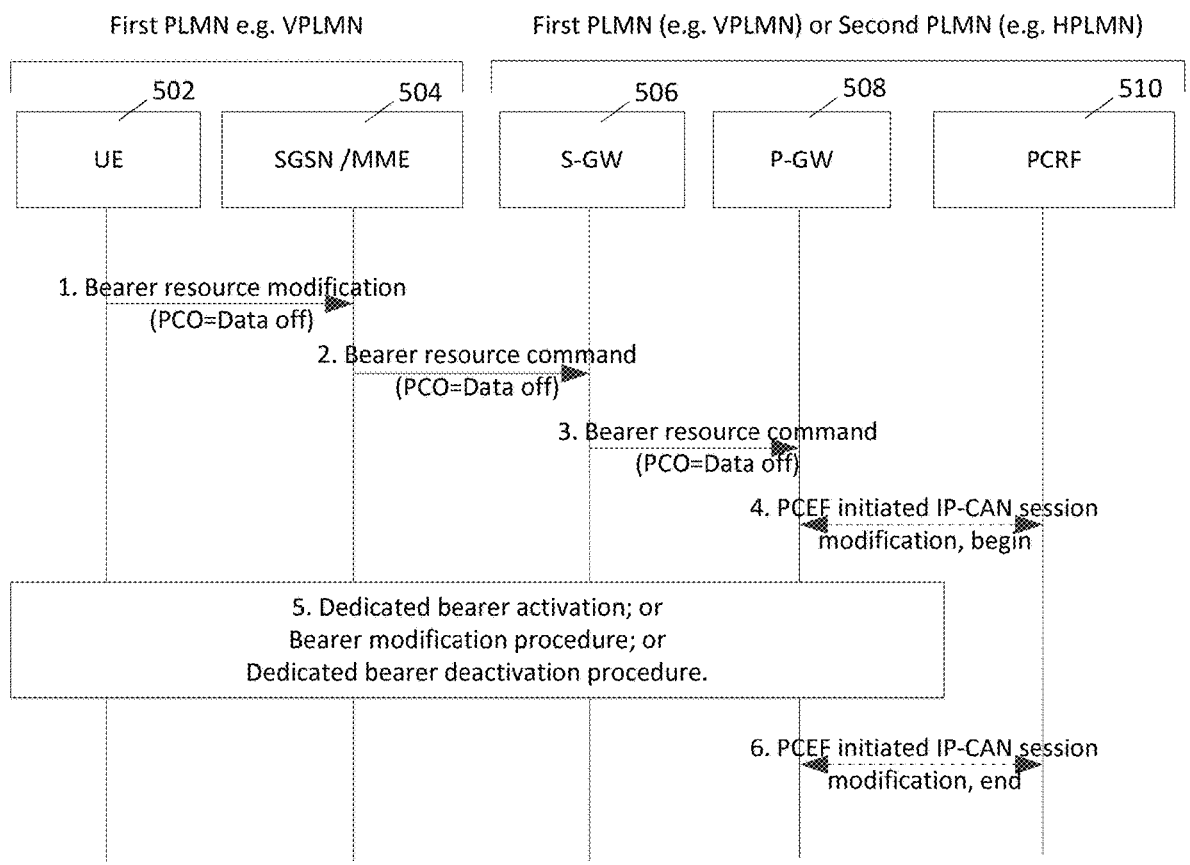
FIG. 5 is a flow diagram illustrating one method of activating/deactivating "Data Off" using PCO while attached, in accordance with an example of the present disclosure.

If the user decides to change the status of the device regarding "Data Off" while the UE is attached, e.g., to an E-UTRAN network, then for one or multiple PDN connections where no data is needed at all (e.g., because no Data Off exempt service needs to use those one or multiple PDN connections) but which are to be retained (e.g., because at least one (default) EPS bearer needs to be in establishment to prevent the UE from (implicitly) detaching from the E-UTRAN), the UE can inform the P-GW to stop sending downlink data/traffic to the UE by using the UE requested bearer resource modification procedure (e.g., as detailed in 3GPP TS 23.040 and 3GPP TS 24.301) and including relevant information within the signaling flow, (e.g., in the PCO information element). The flow diagram of FIG. 5 depicts this scenario.

At step 1, the UE 502 sends a Request Bearer Resource Modification message to the SGSN/MME 504, which includes the following information (e.g., as part of the PCO): Provisioned services for Data Off, location information, Data Off indication and User identity. SGSN/MME 504 may also be considered as network node #0 (NN0), which may be an MSC, MSC Server, etc. See Table 6 in the APPENDIX for an example implementation in which proposed modifications to 3GPP T#24.008 are indicated by underlined text. When 0012H is included, the coding of the Provisioned services for Data Off can be found in Table 10.

At step 2, network Node 0 (MME 504) sends the Bearer Resource Command message to the selected Serving GW (S-GW) 506, which includes the information from step 1 (e.g., as part of the Protocol Configuration Options (PCO)), as received from the UE 502.

At step 3, the SGW 506 sends a Bearer Resource Command message to the PDN Gateway (P-GW) 508 of Network Node X (i.e. NN1, NN2, etc.), which includes the information listed above of step 2 (e.g., as part of the PCO), as received from the MME 504. Based on the received information of the state of the Data Off indication, the P-GW 508 performs one of the following:

If the Data Off indication indicates that "Data Off" is activated, then the P-GW 508 stops sending downlink data/packets to the S-GW 506 for the User identity for the particular PDN connection. The P-GW 508 either silently discards received packets/data from the PDN or returns an appropriate error (e.g., an ICMP error).

If the Data Off indication indicates that Data Off is deactivated/not activated, then the PDN GW sends downlink data/packets to the SGW for the User identity for the particular PDN connection. If the PDN GW previously had stopped sending downlink data/packets to the SGW for the User identity for the particular PDN connection due to having previously received information of the state of the Data Off indication indicating that Data Off was activated, then the PDN GW restarts/re-commences sending downlink data/packets to the SGW for the User identity for the particular PDN connection.

At steps 4-6, the process proceeds as per 3GPP TS 23.040 and 3GPP TS 24.301.

3.1.4 Activation/Deactivation of Data Off using XCAP

3.1.4.1 General

Figure 6:
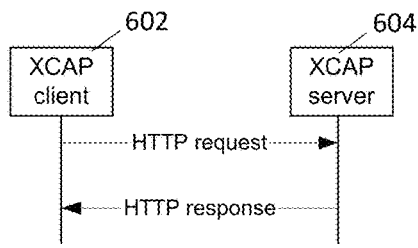
FIG. 6 is a flow diagram illustrating an example process flow between an XCAP client 602 and an XCAP server, in accordance with one example of the present disclosure.

FIG. 6 is a flow diagram illustrating an example process flow between an XCAP client 602 and an XCAP server 604. XCAP 602 client can, for example, be an HSS or UE or an application residing thereon. The XCAP client 602 sends HTTP requests with XML documents. An XML document can configure a Communication Diversion service. This service can be hosted on a TAS or on a AS.

The XML document contains conditions for invoking Communication Diversion. A condition can be unconditional or conditional. The new, proposed condition "Data Off is activated" is an example of an unconditional condition. The new, proposed condition "Data Off" is an example of a conditional condition. The XML document contains conditions describing the media or describing the SIP message names such as INVITE, etc. When the conditions in the XML document are evaluated and met, the communication triggering the evaluation is diverted, e.g., forwarded. The Communication is effectively retargeted. The communication is retargeted with the value of the <target> XML element found in the XML document.

3.1.4.2 Detailed Description

Referring again to FIG. 6, XCAP client 602 could be in an HSS or in a UE. An indication is received that "Data Off" feature is to be activated. If the XCAP client 602 is in the UE, the indication could be activation of the "Data Off" service using an MMI or an indication from a Data Off application. If the XCAP client 602 is in the HSS, the indication could be receipt of one messages described in sections 3.1.1 step 4b.

The XCAP client 602 sends an HTTP Request (e.g., HTTP PUT) containing any of: Provisioned services for Data Off, Location information, Data Off indication, User identity and a call forwarding XML document. The call forwarding XML document may contain any of the following:

1) A Service Description;
2) Media lines describing the service (e.g. Media=audio, Media=video, etc);
3) A condition that can be conditional or unconditional with optional data:
   a. an indication how long the Data Off diversion reason stays active once activated; and
   b. diverted to User identity (i.e. C party address)—the target (Note: Examples of proposed new XCAP elements are shown in Table 7 of the APPENDIX);
4) An indication if the calling party (i.e. A party) is to be notified for the reason of diversion in step 3) with optional free format text field what information could be displayed on the calling party device;
5) An indication if the diverting party (i.e. B party) is to receive notification for the reason of diversion in step 3); and
6) An indication to the diverted to party (i.e. C party) to receive notification for the reason of diversion in step 3).

The XCAP server 604 receives the HTTP Request containing the data sent above. If the XCAP server 604 is co-located with the TAS server, then Call forwarding procedures are followed using the new rules.

Figure 7:
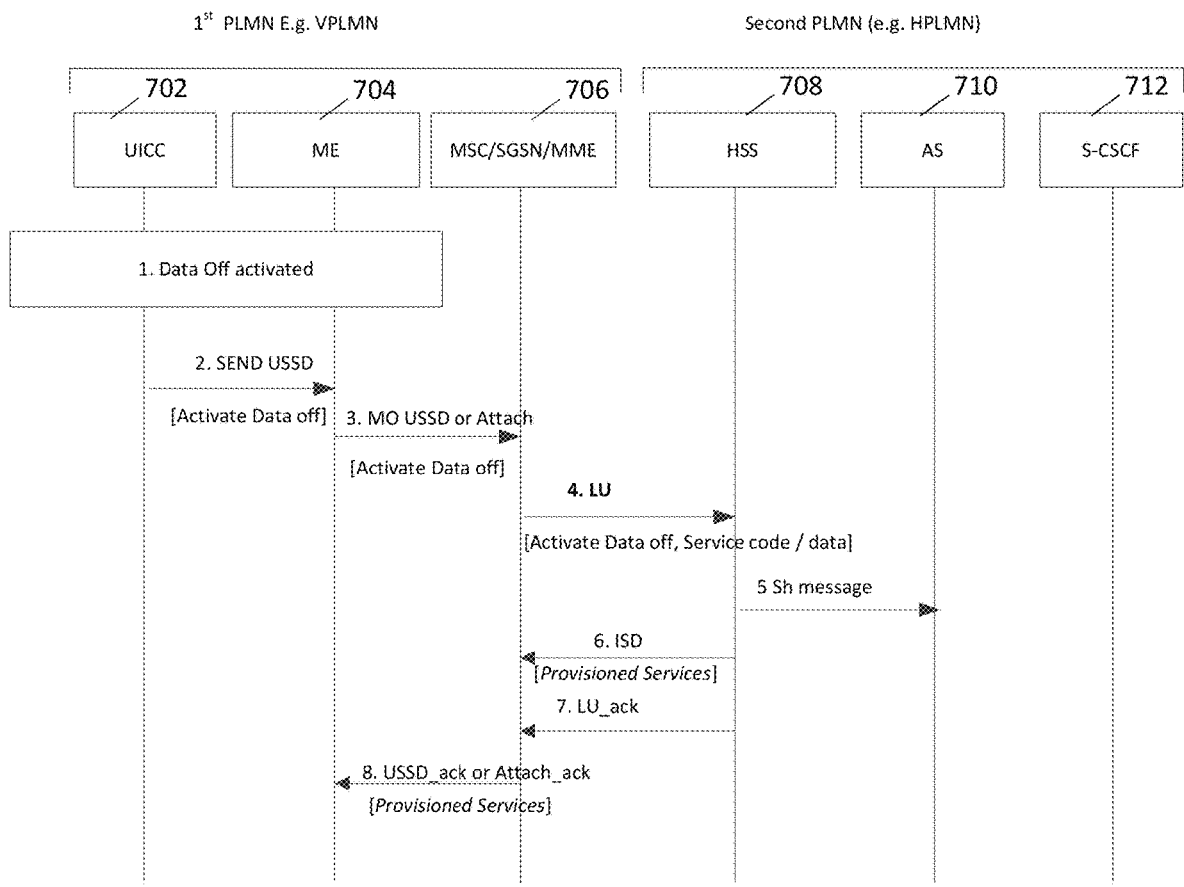
FIG. 7 is a flow diagram illustrating one example of a method of activating and deactivating "Data Off" using updating HSS via network signaling, in accordance with one example of the present disclosure.

3.1.5. Solution #d—Activation/Deactivation of Data Off using Updating HSS via Network Signaling FIG. 7 is a diagrammatic view of one example method of using updating HSS via network signaling to activate/deactivate "Data Off" services in accordance with the present disclosure. Step 1 is performed in the same manner as step 1 in section 3.1.1. In addition, step 2 is optionally performed in the same manner as step 2 in section 3.1.1.

At step 3, ME 704 sends a message e.g., mobile originating (MO) USSD using a *# sequence that is recognized in the VPLMN or an Attach, Routing Area Update, Location Area Update, Tracking area update message containing a Data Off indication. An example of a Data Off indication information element that could be contained in any of the messages that can be found in Table 40 of the APPENDIX. MME/SGSN/MSC 706 (i.e. NN2) receives the sent message.

At step 4, MME/SGSN/MSC 706 sends a MAP Location Update message containing the Data Off indication. It should be noted that the inclusion of the Data Off indication causes a triggering of the MAP location update message if the MME/SGSN/MSC 706 does not already have it stored against the IMSI in the VLR Provisioned services for Data Off. HSS 708 receives the sent message sent and stores the received data against the IMSI that was part of the MAP Location Update message created above. Proposed modifications to the MAP location update message defined by 3GPP TS 29.002 are shown in Table 8 of the APPENDIX.

Step 5 is performed in the same manner as steps 4c1 and 4c2 in section 3.1.1.

At step 6, the HSS 708 sends an Insert Subscriber Data (ISD) to the AS 710 containing Provisioned services for Data Off. This step may occur even if the Data Off indication was not received by the HSS in step 4. Other implementations include if the PS Data Off is not included, not sending the PS Data Off information element back in the ISD. MME/SGSN/MSC 706 receives the sent ISD and stores the Provisioned services for Data Off against the IMSI received in the ISD. Proposed modifications to the MAP ISD defined by 3GPP TS 29.002 are shown in Table 9 of the APPENDIX.

At step 7, the location update procedure is completed by the HSS 708 towards the NN2 (e.g., MSC/SGSN/MME 706). At step 8, MME/SGSN/MSC 706 sends back either a USSD_ack or an Attach_accept, Location Area update accept, Routing Area Update Accept etc. containing, if received in step 6, the Provisioned services for Data Off. See Table 10 in the APPENDIX for new element construct (Note that proposed modifications are underlined). Table 11 in the APPENDIX describes the behavior of the UE upon receipt of the Provisioned services for Data Off.

If the MME/SGSN/MSC 706 did not receive the Data Off indication in step 3, then the MME/SGSN/MSC 706 shall not send the Provisioned services for Data Off. If the services that are exempt for Data Off change, then the HSS 708 sends a Delete subscriber data command containing the updated Provisioned services for Data Off. Proposed modifications to the MAP Delete Subscriber data command as defined by 3GPP TS 29.002 are shown in Table 12 of the APPENDIX.

3.2 Enforcing Data On and Data Off

3.2.1 Solution #e: Mobile Terminated Services

3.2.1.1 MT SMS/USSI/VOICE

Figure 8:
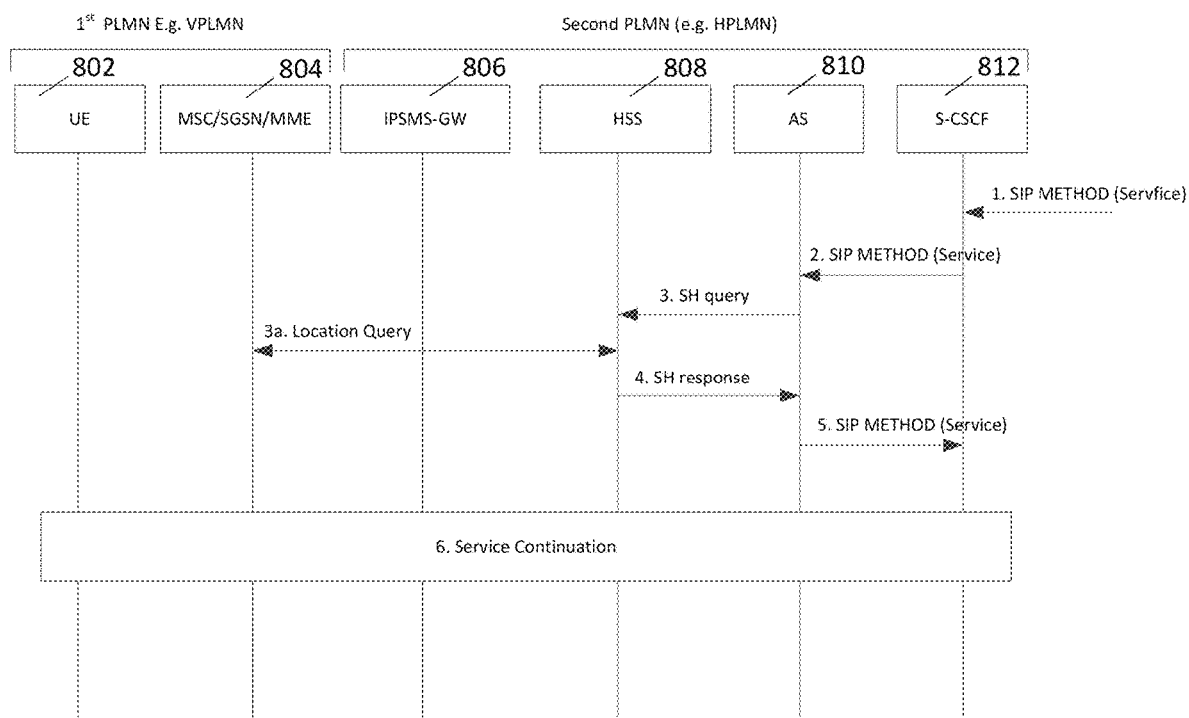
FIG. 8 is an example message flow diagram for enforcing Data On and Data Off, applicable for Mobile Terminated SMSoverIMS, USSI or Voice, in accordance with one example of the present disclosure.

FIG. 8 shows an example message flow diagram for enforcing "Data On" and "Data Off" wherein steps 1-5 could be equally applicable for Mobile Terminated SMSoverIMS, USSI or Voice.

At step 1, S-CSCF 812 receives a SIP METHOD and determines that the SIP METHOD is to be routed to an application server (AS) 810 that handles "Data Off" service. At step 2, S-CSCF 812 sends the message received in step 1 to AS 810 which receives the message.

At step 3, AS 810 sends an Sh message containing URI from the R-URI received in the SIP METHOD and optionally any of:

ICSI, IARI, SIP Method (e.g., SIP INVITE, MESSAGE, INFO, etc.), SDP received in the SDP offer all which can be obtained from the SIP METHOD in step 2b). In this example the information that is sent is for SMS over IMS as defined in Table 13.

Request for location information and optionally the type (s) of location information: Cell ID; Tracking Area code; Location area code; Routing Area code; GPS co-ordinates; ServiceProvider; Service Provider ID; Address; Waypoint' Network Node address; CS location, 3G location.

User state information for CS domain;

See Table 3 for example proposed changes to TADs in 3GPP TS 24.292 and Table 14 for example service identification. HSS 808 receives the sent Sh message.

Returning to FIG. 8, at step 3a, HSS 808 may send a message as described in 3GPP TS 29.078 to MSC/SGSN/MME 804 containing a request for location information for IMSI that is associated with the received URI received with optional indication of the type of location information requested and a request for the user state. The request for location information is performed if the Sh message sent in step 3 had a request for location information. These requests may be combined into the same message or sent separately. The HSS 808 determines whether to send a message to the MSC/SGSN/MME 804 depending on if the HSS 808 has an address for that node stored against the User Identity. HSS 808 receives back one to many messages containing location information and/or user state depending on the requests made in step 3a. HSS 808 may make use of the location information to determine if the service requested in step 3a is allowed over PS or not.

At step 4, HSS 808 responds with a Sh message containing any of the following:

The services that are allowed or not allowed.

If the received ICSI, IARI, SIP Method, etc. (i.e. information received in step 3) is allowed or not allowed. This could be a single indication that indicates "allowed" or "rejected". The absence of the indication could imply the service is allowed.

SDP information that is allowed or not allowed.
Location information
User state information
USSIRegistrationInfo and or SMSRegistrationInfo if the HSS determined that the service was not exempt from Data Off and could be routed over CS.

See Table 5 for example changes to message on the Sh interface. A lack of any the information described in step 4 may imply that the service requested in step 3 above is allowed. Multiple locations could be returned (e.g., Cell ID; Tracking Area code; Location area code; Routing Area code; GPS co-ordinates; ServiceProvider; Service Provider ID; Address; Waypoint' Network Node address, etc.) User states may also be returned. AS 810 receives the message from HSS 808.

At step 5, when the AS 810 receives the data as described in step 4, the AS 810 optionally makes a decision based on other information as well in step 4, if the service is allowed over PS/IMS. (see Table for example text). Upon determining the service is not "Data Off" exempt, AS 810 may, if there is an equivalent service in the CS domain to terminated in CS (step 25 in FIG. 1), send a SIP METHOD to S-CSCF 812, the R-URI of the SIP METHOD to be that of a network node #3 (NN3) (e.g., IP-SM-GW or USSI AS). This may require the AS 810 to send a Sh message containing "SMSRegistrationInfo" or "USSIRegistrationinfo" to HSS 808 to request the containing "SMSRegistrationInfo" or "USSIRegistrationinfo" address. Contents of the SIP METHOD are the same as received in step 2. If no equivalent service exists in the CS domain or AS 810 decides not to terminate the service in the CS domain (e.g. ME does not have CS access), send (step 26 in FIG. 1) a SIP Error. AS 810 may determine that the User identity is not available in the CS domain if no CS domain location was returned in step 4 or the user state returned for CS domain is "Network Determined Not Reachable" as described in 3GPP TS 29.078. CS domain locations may be: Network Node address, Location Area, etc.

3.2.1.4 MT Video

Figure 9:
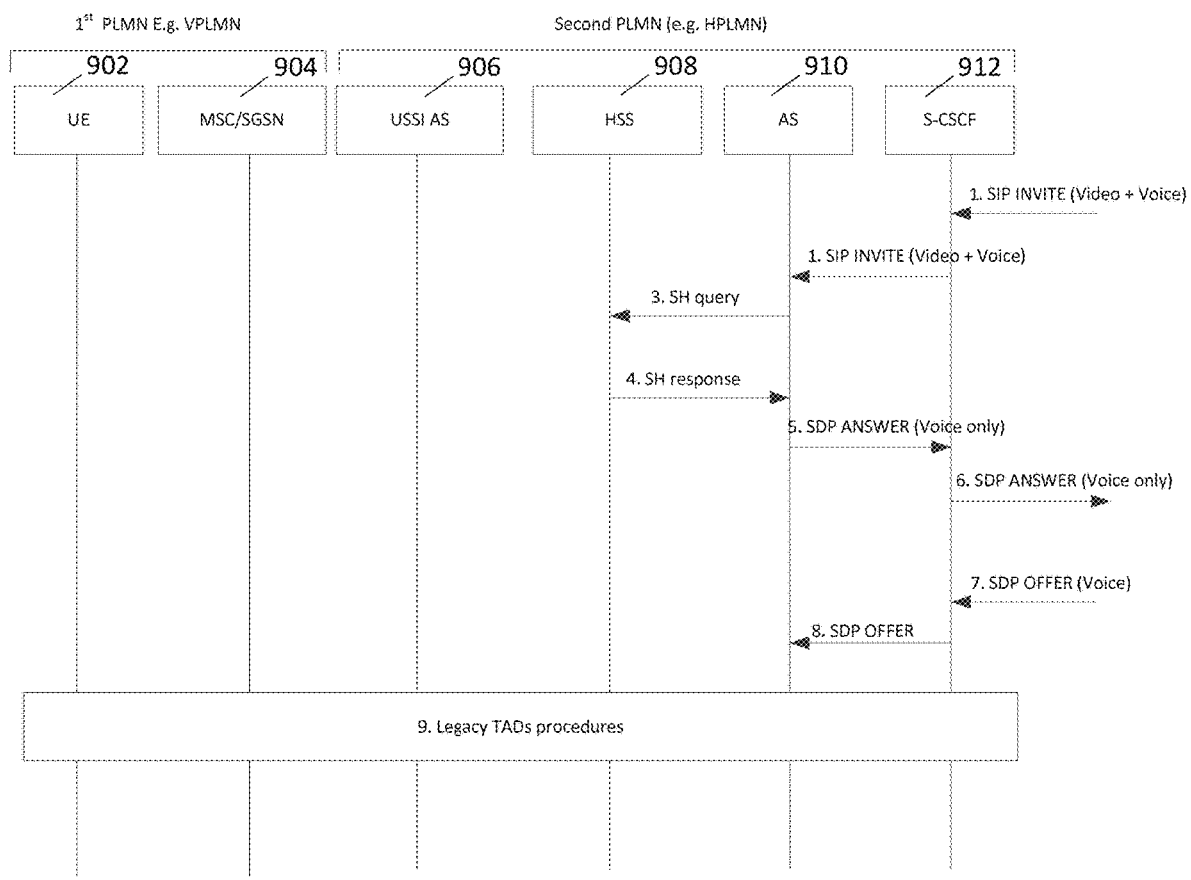
FIG. 9 is an example message flow diagram for enforcing "Data On" and "Data Off" using MT Video, in accordance with an example of the present disclosure.

FIG. 9 shows an example message flow diagram for enforcing "Data On" and "Data Off" using MT Video, in accordance with an example of the present disclosure. Step 1 is performed in a similar manner as step one in section 3.2.1.1. Likewise, step 2 and step 3 are performed in a similar manner as steps 2 and 3 of section 3.2.1.1.

At step 4, NN1 (HSS 908) determines that the requested service is not exempt from "Data Off" service and a service exempt from "Data Off" is substituted for the requested service, (e.g., Video was requested however only voice is exempt). HSS 908 sends back a message containing an indication of service that is allowed and NN2 (e.g., AS 910) receives the message.

At step 5, NN2 (e.g., AS 910) sends an SDP Answer with an indication of the service that is allowed and the parts of the service that are not allowed. In this example, the ANSWER contains indication that only voice is being accepted by the receiving entity. S-CSCF 912 receives the SDP ANSWER in the SIP messages and sends the SDP ANSWER to the originating party.

Steps 6, 7 and 8 are performed as per 3GPP TS 24.229. NN2 (AS 910) receives the SDP OFFER and proceeds with executing TADs procedures.

3.2.1.5 Ongoing Sessions

Figure 10:
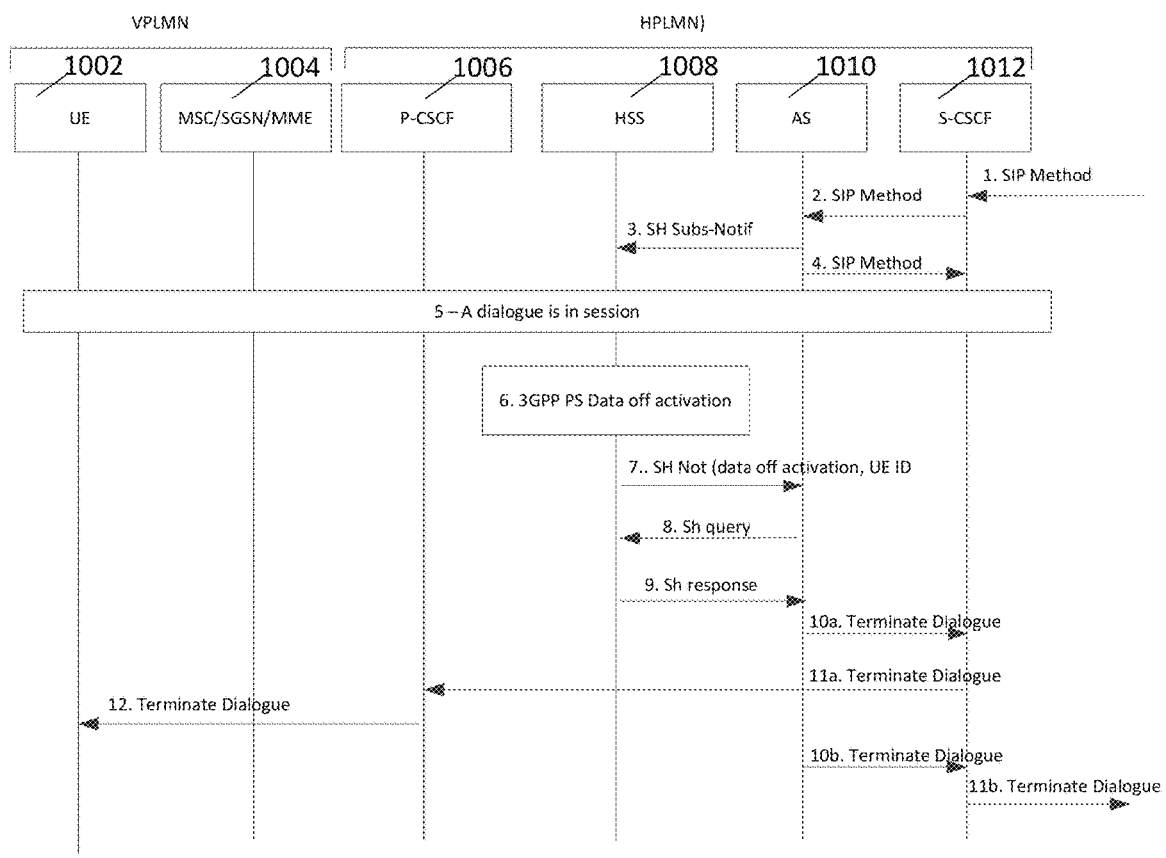
FIG. 10 is an example message flow diagram of network enforcement of existing sessions for 3GPP PS Data Off, in accordance with an example of the present disclosure.

FIG. 10 shows an example message flow diagram of network enforcement of existing sessions for 3GPP PS Data Off, in accordance with an example of the present disclosure. At step 1, S-CSCF 1012 receives a SIP METHOD. At step 2, S-CSCF 1012 sends the SIP METHOD to AS 1010.

At step 3, optionally, the AS 1010 sends a Sh-Subs-Notif to HSS 1008 containing an indication to receive a notification 3GPP PS Data Off is activated. At step 4, the AS 1010 allows the session/dialogue to continue to be set-up. At step 5, a dialogue is ongoing. At step 6, HSS 1008 receives a 3GPP PS Data Off activation as per existing functionality as defined in 3GPP TS 23.702 or solutions defined within this application. At step 7, HSS 1008 sends a Sh Notif indicating 3GPP PS Data Off has been activated for a User identity.

At step 8, if there is an existing dialogue over PS for the User identity identified in step 3, the AS 1010 sends a Sh query to the HSS 1008 containing a Service Description of the dialogue that is ongoing in step 1 and the R-URI received in the SIP METHOD associated with that ongoing dialogue in step 1. The Service Description could be the SIP METHOD, ICSI, SDP information, etc. It should be noted that an existing dialogue over PS could be determined by the g.3gpp.ics feature tag=Server. If no PS dialogue exists, the rest of the steps are skipped.

At step 9, the HSS 1008 sends an Sh response to the AS 1010 indicating if the service is allowed or should be terminated based on the location of the UE associated with the UE which can be determined, (e.g., by stored MSC, SGSN, MME number, etc.), the service description received in the Sh query, which services are 3GPP PS Data Off Exempt Services. At step 10a, a dialogue termination is sent to the terminating party and, at step 10b, a dialogue termination is sent to the originating party.

3.2.1.6 XCAP

Returning to FIG. 10, if the received XML document (See FIG. 6) contained a conditional reason, then forwarding for Data Off will become active if the network node 2 (e.g., XML server, TAS) also receives an indication that Data Off has been activated for the User identity. See section 3.1 for possible implementations of how an indication maybe delivered to Network Node 2.

At step 1, S-CSCF 1012 receives a SIP METHOD and determines that the SIP METHOD is to be routed to a NN2, (e.g., AS 1010 that handles "Data Off" service). At step 2, S-CSCF 1012 sends the message received in step 1 to NN2 (AS 1010).

Upon receiving the SIP METHOD, AS 1010 may do any of the following:

In the conditional Data Off case, (e.g., "Data Off"): if, for example, "Data Off" is present in the XML document configured at the AS 1010 when a communication (i.e. SIP METHOD) is received at the AS 1010, and the AS 1010 was informed via other means that the Data Off condition applies for the User identity addressed by the SIP METHOD, then the SIP METHOD is retargeted using the target element in the XML document.
  In the unconditional Data Off case, (e.g., "Data Off is activated"): if, for example, "Data Off is activated" is present in the XML document configured at the AS 1010 when a communication (i.e. SIP message) is received at the AS 1010, then the SIP METHOD is retargeted using the target element in the XML document.
  The AS 1010 can notify various parties. The AS 1010 can inform the User identity on which behalf it is evaluating communication diversion XML documents. The AS 1010 uses a MESSAGE SIP message for the information.

3.2.2 Mobile Originated Solutions

If the UICC/USIM/ISIM/Application on the UICC receives an acknowledgment/indication of that the setting of "Data Off" was successful or the ME is in LIMITED SERVICE STATE (see section 3.1.1), then the UICC/USIM/ISIM/Application may set the following services as available depending on the services that are exempt for Data Off:
  USIM Service no30 "available" (Call control by USIM);
  USIM Service no31 "available" (MO-SMS control by USIM);
  USIM Service no93 "available" (Communication Control for IMS for USIM);
  USIM Service no87 "available" (Call control on EPS PDN connection by USIM); and
  USIM Service no54 "available" (Call control on GPRS by USIM).
The UICC/USIM/ISIM/Application then issues a REFRESH command to the ME.

Optionally, the UICC may send additional commands to the ME containing text information to be displayed on the screen. Table 72 in the APPENDIX shows some example text that could be included in the standard as indicated by underlining. Note that if the UICC implements the functionality the term UE is replaced by UICC. The UICC will determine the location of the ME by using the "Provide Local Information" command as described in section 3.1.1.

If the service is implemented on an application on the UICC, the following will occur:
  If a call is made and USIM Service no30 "available" or USIM Service no93 "available", then the ME will perform the procedures in TS 31.111. Basically, the ME sends an ENVELOPE (CALL CONTROL) command to the UICC contain the data per TS31.111 or SET UP CALL.
  If PDP context is activated and USIM Service no54 "available", then the ME will perform the procedures in TS 31.111.
  If EPS PDN is to be activated and USIM Service no87 "available", then the ME will perform the procedures in TS 31.111.

The latter two cases will prevent use of XCAP and OMA DM if the UICC application determines these not to be exempt from 3GPP PS Data Off service. Basically, the ME sends an ENVELOPE (CALL CONTROL) command to the UICC containing the data per TS31.111 for the above scenarios. Possible enhancements to 3GPP TS 31.111 to support better handling of MO sessions can be found in Table 23 of the APPENDIX as underlined text.

4. UE Configuration

Figure 11:
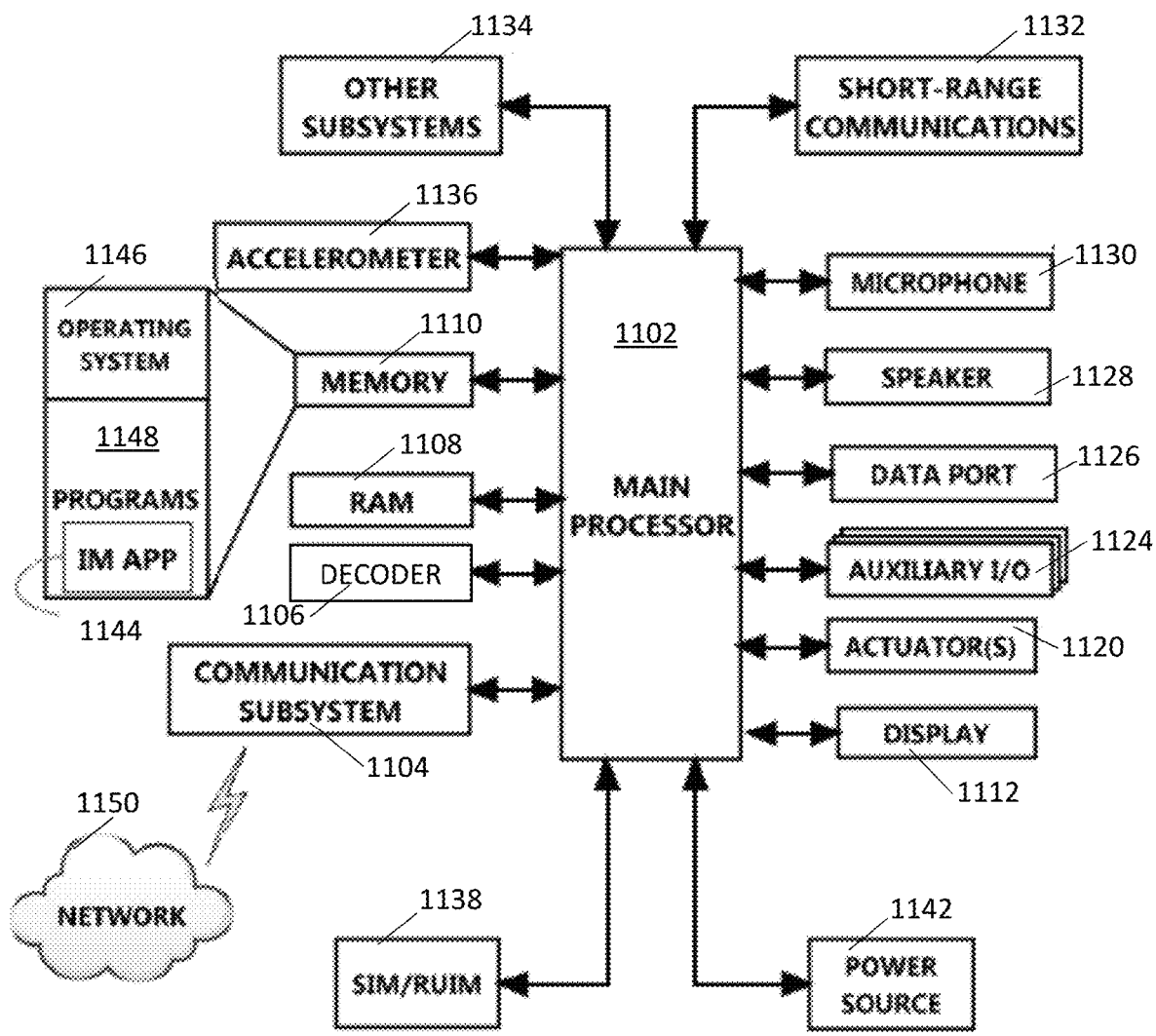
FIG. 11 is a block diagram illustrating an example UE in accordance with one example of the present disclosure.

A block diagram of an example of a wireless communication device 1100, such as UE 402, 502, 802, 902, 1002, is shown in FIG. 11. The wireless communication device 1100 includes multiple components, such as a processor 1102 that controls the overall operation of the wireless communication device. Communication functions, including data and voice communications, are performed through a communication subsystem 1104 which includes a communication interface. Data received by the wireless communication device is decompressed and decrypted by a decoder 1106. The communication subsystem 1104 receives messages from and sends messages to a wireless network 1150. The wireless network 1150 may be any type of wireless network, including, but not limited to, data wireless networks, voice wireless networks, and networks that support both voice and data communications. A power source 1142, such as one or more rechargeable batteries or a port to an external power supply, powers the wireless communication device.

The processor 1102 interacts with other components, such as Random Access Memory (RAM) 1108, memory 1110, a display 1112 (which may be a touch-sensitive display), one or more actuators 1120, an auxiliary input/output (I/O) subsystem 1124, a data port 1126, a speaker 1128, a microphone 1130, short-range communications 1132, and other device subsystems 1134. User-interaction with a graphical user interface is performed through the touch-sensitive display 1112. Information, such as text, characters, symbols, images, icons, and other items that may be displayed or rendered on a portable electronic device, is displayed on the touch-sensitive display 1112 via the processor 1102. The processor 1102 may interact with an accelerometer 1136 that may be utilized to detect direction of gravitational forces or gravity-induced reaction forces.

To identify a subscriber for network access, the wireless communication device 1100 uses a Subscriber Identity Module or a Removable User Identity Module (SIM/RUIM) card 1138 for communication with a network, such as the wireless network 1150. Alternatively, user identification information may be programmed into memory 1110.

The wireless communication device 1100 includes an operating system 1146 and software programs or components 118, such as an instant messaging application 1144 that are executed by the processor 1102 and are typically stored in a persistent, updatable store such as the memory 1110. Additional applications or programs may be loaded onto the wireless communication device 1000 through the wireless network 1150, the auxiliary I/O subsystem 1124, the data port 1126, the short-range communications subsystem 1132, or any other suitable subsystem 1134.

A received signal such as a text message, an e-mail message, instant message or web page download is processed by the communication subsystem 1104 and input to the processor 1102. The processor 1102 processes the received signal for output to the display 1112 and/or to the auxiliary I/O subsystem 1124. A subscriber may generate data items, for example e-mail messages, which may be transmitted over the wireless network 1850 through the communication subsystem 1104. For voice communications, the overall operation of wireless communication device 1100 is similar. The speaker 1128 outputs audible information converted from electrical signals, and the microphone 1130 converts audible information into electrical signals for processing.

The touch-sensitive display 1112 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay. The overlay may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 1112. The processor 1102 may determine attributes of the touch, including a location of a touch. Touch location data may include an area of contact or a single point of contact, such as a point at or near a center of the area of contact. A signal is provided to a display controller (not shown) in response to detection of a touch. A touch may be detected from any suitable contact member, such as a finger, thumb, appendage, or other objects, for example, a stylus, pen, or other pointer, depending on the nature of the touch-sensitive display 1112. Multiple simultaneous touches may be detected.

One or more actuators 1120 may be depressed or activated by applying sufficient force to the actuators 1120 to overcome the actuation force of the actuator. The actuator(s) 1820 may provide input to the processor 1102 when actuated. Actuation of the actuator(s) 1820 may result in provision of tactile feedback.

5. Advantages

Previous proposals require modifications to numerous elements in the network, such as the ME (this requires modifications to both NAS and IMS protocols), MME, S-CSCF, P-GW, etc. Additionally, operators implementing such previous proposals would need to deploy new software to support the features and also have to wait for subscribers to change their devices. Current proposals 3.1 and 3.2 described herein allow the majority of subscribers to keep their existing MEs and, furthermore, simplifies implementation of the "Data Off" feature by, optionally, downloading/provisioning an application onto the USIM or upgrading their HSS and SCC AS.

The solutions described herein work for both 2G, 3G and LTE because SMS and USSD are features available in the foregoing technologies.

Furthermore, if a user makes an emergency call, USAT commands already have a mechanism in place whereby the USAT command is not executed, thus allowing the emergency call to proceed.

Because the application is on the UICC and the UICC is aware of all sessions in progress if Data Off is activated midsession, then the UICC can terminate sessions in progress if need be.

6. Non-Limiting Embodiments

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system."

The present disclosure may comprise a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer maybe connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

APPENDIX

| 10 3GPP PS Data Off |
| --- |
| 10.1 Description<br><br>3GPP PS Data Off is a feature which, when configured by the HPLMN and activated by the user, prevents transport via PDN connections in 3GPP access networks of all IP packets except IP packets required by 3GPP PS Data Off Exempt Services.<br><br>10.2 Requirements<br><br>The 3GPP system shall provide a mechanism by which an operator can configure which operator services are defined as 3GPP PS Data Off Exempt Services for their own subscribers.<br><br>When 3GPP PS Data Off is activated in the UE, in order to preserve charging consistency:<br><br>- the UE shall inform the network that 3GPP PS Data Off is activated,<br>- the UE shall cease the sending of uplink IP Packets of all services that are not 3GPP PS Data Off Exempt Services, and<br>- the network shall cease the sending of downlink IP Packets to the UE for all services that are not 3GPP PS Data Off Exempt Services.<br><br>NOTE: Disabling of IP Packets on both the uplink and downlink is needed in order to provide consistency of charging between HPLMN and VPLMN, as well as consistency between what the user expects and what the user may be billed for.<br><br>3GPP PS Data Off may be activated based on roaming status.<br><br>Each of the following operator services shall be configurable by the HPLMN operator on a per PLMN basis to be part of the 3GPP PS Data Off Exempt Services:<br><br>- MMTel Voice;<br>- SMS over IMS;<br>- USSD over IMS (USSI);<br>- MMTel Video;<br>- particular IMS services not defined by 3GPP, where each such IMS service is identified by an IMS communication service identifier;<br>- Device Management over PS; and<br>- IMS Supplementary Service configuration via the Ut interface using XCAP.<br><br>The user should be made aware of the services that are 3GPP PS Data Off Exempt Services. |

Table 1 – 3GPP TS 22.011

7.6.6.1 Location information for CS

This information element consists of the following subordinate information elements:

- Location number: defined in ITU-T Recommendation Q.763. Considerations described in 3GPP TS 23.018 apply.

- Service area ID: defined in 3GPP TS 23.003.

- Cell Global ID: defined in 3GPP TS 23.003.

- Location area ID: defined in 3GPP TS 23.003.

- Geographical Information: defined in 3GPP TS 23.032. Considerations described in 3GPP TS 23.018 and 3GPP TS 29.002 apply.

- Geodetic Information: defined in ITU-T Recommendation Q.763. Considerations described in 3GPP TS 23.018 and 3GPP TS 29.002 apply.

- VLR Number: defined in 3GPP TS 23.003.

- MSC Number: defined in 3GPP TS 23.003.

- Age of location information: defined in 3GPP TS 23.018.

- Current Location Retrieved: shall be present when location information was obtained after a successful paging procedure for Active Location Retrieval if the MS is in idle state or when the location was provided if the MS is in active state.

- User CSG information: defined in 3GPP TS 23.060.

- E-UTRAN Cell Global ID: defined in 3GPP TS 23.003.

- Tracking Area ID: defined in 3GPP TS 23.003.

- Local Time Zone: the Local Time Zone information (Time Zone and Daylight Saving Time) of the location in the visited network where the UE is attached, as defined in 3GPP TS 29.272.

NOTE: When the MSC receives the location information via SGs interface as specified in 3GPP TS 29.118, the E-UTRAN Cell Global ID and Tracking Area ID are included, rather than Location number, Service area ID, Cell Global ID and Location area ID.

*Table 2 – Location information (extract from 3GPP TS 29.328)*

Table 7.6.1: Data accessible via Sh interface

| Data Ref. | XML tag | Defined in | Access key | Operations |
|---|---|---|---|---|
| 0 | RepositoryData | 7.6.1 | Data Reference + ( IMS Public User Identity OR Public Service Identity ) + Service Indication | Sh-Pull Sh-Update Sh-Subs-Notif (Note 1, Note 3) |
| 10 | IMSPublicIdentity | 7.6.2 | Data Reference + ( IMS Public User Identiy OR Public Service Identity OR MSISDN ) + [ Requested Identity Set ] | Sh-Pull Sh-Subs-Notif |
| 11 | IMSUserState | 7.6.3 | Data Reference + IMS Public User Identity | Sh-Pull Sh-Subs-Notif |
| 12 | S-CSCFName | 7.6.4 | Data Reference + ( IMS Public User Identity OR Public Service Identity ) | Sh-Pull Sh-Subs-Notif (Note 1) |
| 13 | InitialFilterCriteria | 7.6.5 | Data Reference + ( IMS Public User Identity OR Public Service Identity ) + Application Server Name | Sh-Pull Sh-Subs-Notif (Note 1) |

| 14 | LocationInformation | 7.6.6 | Data Reference<br>+ ( IMS Public User Identity OR MSISDN )<br>+ [ Private Identity ]<br>+ Requested Domain<br>+ Current Location<br>+ [ Serving Node Indication ]<br>+ [ Requested Nodes ]<br>+ [ Local Time Zone Indication ]<br>+ [ RAT-Type Requested ] | Sh-Pull<br>(Note 5)<br>(Note 6)<br>(Note 7) |
|---|---|---|---|---|
| 15 | UserState | 7.6.7 | Data Reference<br>+ ( IMS Public User Identity OR MSISDN )<br>+ [ Private Identity ]<br>+ Requested Domain<br>+ [ Requested Nodes ] | Sh-Pull<br>(Note 5)<br>(Note 7) |
| 16 | Charging information | 7.6.8 | Data Reference<br>+ ( IMS Public User Identity OR Public Service Identity OR MSISDN ) | Sh-Pull<br>Sh-Subs-Notif |
| ..... | | | | |
| 24 | SMSRegistrationInfo | 7.6.16 | Data Reference<br>+ ( IMS Public User Identity OR MSISDN )<br>+ [ Private Identity ] | Sh-Pull<br>Sh-Update<br>(Note 5) |

| 25 | UE reachability for IP | 7.6.17 | Data Reference + ( IMS Public User Identity OR MSISDN ) + [ Private Identity ] | Sh-Subs-Notif (Note 5) |
|---|---|---|---|---|
| 26 | T-ADS Information | 7.6.18 | Data Reference + ( IMS Public User Identity OR MSISDN ) + [ Private Identity ] | Sh-Pull (Note 5) |
| .... | | | | |
| 31 | Reference Location Information | 7.6.23 | Data Reference + IMS Public User Identity + [ Private Identity ] | Sh-Pull (Note 5) |
| 32 | IMSI | 7.6.24 | Data Reference + IMS Public User Identity + [ Private Identity ] | Sh-Pull (Note 5) (Note 8) |
| 33 | IMSPrivateUserIdentity | 7.6.25 | Data Reference + IMS Public User Identity | Sh-Pull Sh-Subs-Notif (Note 8) |

| | |
|---|---|
| Note 1: | If an AS subscribes to a Specific PSI matching a Wildcarded PSI, the notification shall be sent as if the subscription was made to the corresponding Wildcarded PSI. If an AS requires reading for a Specific PSI matching a Wildcarded PSI, the response shall be sent as if the request was made to the corresponding Wildcarded PSI. |
| Note 2: | If not specified otherwise Public User Identity and Public Service Identity refer also to the wildcarded identities. |
| Note 3: | Any IMS Public User Identity in an Alias Public User Identity Set may be used as a key for the repository data of the group. All IMS Public User Identities within the same set shall be considered alias of each other and shall share the same transparent data. See 3GPP TS 23.008 for the definition of an Alias Public User Identity Set. |
| Note 4: | If several MSISDNs are associated to the Public identity, an AS shall be required to indicate the IMS Private User Identity to fetch the C-MSISDN. See 3GPP TS 23.003 and 3GPP TS 23.237 for the definition of C-MSISDN. ExtendedMSISDN is returned in addition to MSISDN when Additional-MSISDN feature is enabled |
| Note 5: | If a Sh procedure refers to a specific Private Identity within a set of multiple Private identities associated to an IMS Public User Identity or MSISDN, the corresponding Sh request shall include this Private Identity as part of the access key. |
| Note 6: | Serving Node Indication is optionally included only if Current Location takes the value DoNotNeedInitiateActiveLocationRetrieval |
| Note 7: | Requested Nodes is only applicable when Requested Domain is PS |
| Note 8: | IMSI and IMS Private User Identity may be considered sensitive data, which not all ASs may be permitted to retrieve. See clause 6.2. |

*Table 3 – Data Accessible via Sh Interface (extract from 3GPP TS 29.328)*

8.27 Location status

....

Location status:

- Contents:
  - This data object indicates the current service state of the terminal:
    - "normal service" shall indicate that the terminal is in a state where all requests for services are treated normally;
    - "limited service" shall indicate that the terminal is in a state where only emergency call services are offered;
    - "no service" shall indicate that the terminal is in a state where no services are offered.
- Coding:
  - Each byte in the event list shall be coded with one of the values below:
    - '00' = Normal service;
    - '01' = Limited service;
    - '02' = No service.

*Table 4 – Extract from ETSI TS 102 223 V13.0.0*

---

In the following example, 10 means 3GPP Data Off activated and values 1, 2 and 5 represent specific services:

*10*1,2,5#

In the following example, 11 means 3GPP Data Off deactivated:

*11*SI#

In the following examples, the service code (SC) 10 means 3GPP Data Off and value 1 means activation, 2 means deactivation:

*10*1#

*10*2#

*Table 3 – Example USSD command*

3GPP TS 24.008 Section 10.5.6.3 Protocol configuration options

The purpose of the *protocol configuration options* information element is to

Table 10.5.154/3GPP TS 24.008: *Protocol configuration options* information element

---

Configuration protocol (octet 3)

Bits 3 2 1

0 0 0   PPP for use with IP PDP type or IP PDN type (see 3GPP TS 24.301 [120])

All other values are interpreted as PPP in this version of the protocol.

After octet 3, i.e. from octet 4 to octet z, two logical lists are defined:

- the Configuration protocol options list (octets 4 to w), and
- the Additional parameters list (octets w+1 to z).

Configuration protocol options list (octets 4 to w)

.......

Additional parameters list (octets w+1 to z)

The *additional parameters list* is included when special parameters and/or requests (associated with a PDP context) need to be transferred between the MS and the network. These parameters and/or requests are not related to a specific configuration protocol (e.g. PPP), and therefore are not encoded as the "Packets" contained in the *configuration protocol options list*.

The *additional parameters list* contains a list of special parameters, each one in a separate container. The type of the parameter carried in a container is identified by a specific *container identifier*. In this version of the protocol, the following container identifiers are specified:

MS to network direction:

- 0001H (P-CSCF IPv6 Address Request);
- 0002H (IM CN Subsystem Signaling Flag);

- 0003H (DNs Server IPv6 Address Request);
- 0004H (Not Supported);
- 0005H (MS Support of Network Requested Bearer Control indicator);
- 0006H (Reserved);
- 0007H (DSMIPv6 Home Agent Address Request;
- 0008H (DSMIPv6 Home Network Prefix Request);
- 0009H (DSMIPv6 IPv4 Home Agent Address Request);
- 000AH (IP address allocation via NAS signalling);
- 000BH (IPv4 address allocation via DHCPv4);
- 000CH (P-CSCF IPv4 Address Request);
- 000DH (DNs Server IPv4 Address Request);
- 000EH (MSISDN Request);
- 000FH (IFOM-Support-Request);
- 0010H (IPv4 Link MTU Request);
- 0011H (MS support of Local address in TFT indicator); ~~and~~
- <u>0012H (Data indication activated);</u>
- <u>0013H (Data indication deactivated); and</u>
- FF00H to FFFFH reserved for operator specific use.

Network to MS direction:
- 0001H (P-CSCF IPv6 Address);
- 0002H (IM CN Subsystem Signaling Flag);
- 0003H (DNs Server IPv6 Address);
- 0004H (Policy Control rejection code);
- 0005H (Selected Bearer Control Mode;
- 0006H (Reserved);
- 0007H (DSMIPv6 Home Agent Address) ;
- 0008H (DSMIPv6 Home Network Prefix);
- 0009H (DSMIPv6 IPv4 Home Agent Address);

| |
|---|
| - 000AH (Reserved);<br>- 000BH (Reserved);<br>- 000CH (P-CSCF IPv4 Address);<br>- 000DH (DNs Server IPv4 Address);<br>- 000EH (MSISDN);<br>- 000FH (IFOM-Support);<br>- 0010H (IPv4 Link MTU);<br>- 0011H (Network support of Local address in TFT indicator); ~~and~~<br><br>- 0012H *Provisioned services for Data Off;*<br><br>- FF00H to FFFFH reserved for operator specific use....... |

*Table 6 – Proposed modifications to 3GPP TS 24.008*

| |
|---|
| <xs:element name="no-data" type="ss:empty-element-type"/> - Unconditional condition<br><xs:element name="no-data-active" type="ss:empty-element-type"/> - Conditional condition |

*Table 7 – Proposed new XCAP elements*

8.1.2.2 Service primitives

Table 8.1/2: MAP_UPDATE_LOCATION

| Parameter name | Request | Indication | Response | Confirm |
|---|---|---|---|---|
| Invoke Id | M | M(=) | M(=) | M(=) |
| IMSI | M | M(=) | | |
| MSC Address | M | M(=) | | |
| ...... | | | | |
| HLR number | | | C | C(=) |
| PS Data Off | C | C(=) | | |
| User error | | | C | C(=) |
| Provider error | | | | O |

8.1.2.3 Parameter definitions and use

ADD Capability

This parameter indicates, if present, the support of ADD function by the HLR.

PS Data Off

This parameter identifies the service PS Data Off has been activated in the UE.

ALTERNATIVE

PS Data Off

This parameter identifies the service PS Data Off is supported in the UE.

*Table 8 – Proposed modification to 3GPP TS 29.002*

8.8.1.2 Service primitives

Table 8.8/1: MAP-INSERT-SUBSCRIBER-DATA

| Parameter name | Request | Indication | Response | Confirm |
|---|---|---|---|---|
| Invoke Id | M | M(=) | M(=) | M(=) |
| IMSI | C | C(=) | | |
| MSISDN | C | C(=) | | |
| Additional MSISDN | C | C(=) | | |
| …… | | | | |
| Supported Features | | | U | C (=) |
| PS Data Off | C | C(=) | | |
| User error | | | U | C(=) |
| Provider error | | | | O |

8.8.1.3 Parameter use

All parameters are described in clause 7.6. The following clarifications are applicable:

IMSI-Group-Id List

A list of IMSI-Group-Id parameters each of which identifies an IMSI-Group the subscriber belongs to.

PS Data Off

This parameter identifies the services that are exempt from PS Data Off.

*Table 9 - Proposed modification to 3GPP TS 29.002*

10.5.x  Provisioned services for Data Off

The purpose of the *Provisioned services for Data Off* information element is to indicate the state of *Provisioned services for Data Off service* from the network and the services that are exempt from *Provisioned services for Data Off*.

The *Coding for Provisioned services for Data Off* information element is as shown in figure 10.5.X/3GPP TS 24.008 and table 10.5.X/3GPP TS 24.008. Multiple copies of the *Coding for Provisioned services for Data Off* information element may appear in *Provisioned services for Data Off* information element if more than one service is exempt.

| 8 | 7 | 6 | 5 | 4 | 3 | 2 | 1 | |
|---|---|---|---|---|---|---|---|---|
| Provisioned services for Data Off IEI ||||||||  octet 1 |
| Length |||||||| octet 2 |
| Reserved | Reserved | Coding for Provisioned services for Data Off |||||| Octect3 |

Figure 10.5.X/3GPP TS 24.008 Provisioned services for Data Off information element

Table 10.5.X/3GPP TS 24.008: Coding for Provisioned services for Data Off

Bits

<u>7 6</u>

0 0     Reserved 1 0     Reserved

All other values are reserved.

Fixed network user rate (octet 6d)

Bit

<u>5 4 3 2 1</u>

0 0 0 0 0          "Data Off" Service deactivated.

0 0 0 0 1          "Data Off" Service activated.

0 0 0 1 0          MMTel Video 0 0 0 1 1          SMS over IMS 0 0 1 0 0          USSD over IMS (USSI)

0 0 1 0 1          Device Management over PS 0 0 1 1 0          IMS Supplementary Service configuration via the Ut interface using XCAP 0 0 1 1 1          particular IMS services not defined by 3GPP, where each such IMS service is identified by an IMS communication service identifier 0 1 0 0 0          MMTel Voice All other values are reserved.

*Table 40 - Proposed changes to 3GPP TS 24.008*

> 5.5.1.3.4.2 Combined attach successful
>
> …..
>
> If the ATTACH ACCEPT message includes the *Provisioned services for Data Off*, i.e. with a value other than zero, then the UE shall store the received Provisioned Services for Data Off services that are exempt from the Data Off service. If the Data Off service was triggered via USAT command as defined in 3GPP TS 31.102, the ME shall perform the procedures in 3GPP TS 31.102.

*Table 11 - Proposed changes to 3GPP TS 24.301*

> 8.8.2 MAP-DELETE-SUBSCRIBER-DATA service
>
> 8.8.2.1 Definition
>
> …..
>
> 8.8.2.2 Service primitives
>
> Table 8.8/2: MAP-DELETE-SUBSCRIBER-DATA
>
> | Parameter name | Request | Indication | Response | Confirm |
> |---|---|---|---|---|
> | Invoke Id | M | M(=) | M(=) | M(=) |
> | IMSI | M | M(=) | | |
> | Basic service List | C | C(=) | | |
> | | | | | |
> | ……. | | | | |
> | PS Data Off | C | C(=) | | |
> | User error | | | C | C(=) |
> | Provider error | | | | O |
>
> 8.8.2.3 Parameter use
>
> All parameters are described in clause 7.6. The following clarifications are applicable:
>
> S Data Off
>
> This parameter identifies the services that are exempt from PS Data Off.

*Table 12 - Proposed modification to 3GPP TS 29.002*

| |
|---|
| 10.4.2 Terminating Access Domain Selection<br>When the SCC AS serving the terminating UE receives an initial SIP INVITE request due to initial filter criteria and a session used for IMS PS voice does not exist for the UE, the SCC AS may perform:<br>  o) the procedures as described in 3GPP TS 29.328 to determine if<br><br>    <u>I) IMS voice over PS session is supported or unknown over the Radio Access Technology the UE is current on. And</u><br><br>    <u>ii) The service as described in the SDP Offer received in the SIP INVITE is a "Data Off" exempt service.</u><br><br>ALTERNATIVE<br><br>    <u>ii) if "Data Off" is active and what services are exempt.</u><br><br>ALTERNATIVE<br><br>    <u>ii) if the service received in the initial SIP INVITE is allowed to be delivered over PS.</u> |

*Table 13 – Proposed changes to 3GPP TS 24.292*

| Service | Definition |
|---|---|
| Voice | SIP Method: INVITE<br>Feature tag = audio |
| Video | SIP Method: INVITE<br>Feature tag = video |
| SMS over IMS | SIP Method: MESSAGE |
| USSI | SIP Method: INVITE<br>Accept-Contact: *;+g.3gpp.icsi-ref="urn%3Aurn-7%3gpp-service.ims.icsi.mmtel"<br>Content-Type: application/vnd.3gpp.ussd+xml |

*Table 14 – Example Service identification*

3GPP TS 29.328

6.1.1.1 Detailed behaviour

The HSS may prioritise the received request message according to priority level received within the Session-Priority AVP.

> NOTE 1: Refer to Annex I for HSS procedures associated with the handling of both the Session-Priority AVP and DRMP AVP received in the request message.

- ………

4b. If CSRN is requested but roaming number retrieval from the MSC/VLR fails, the HSS shall include an empty CSRN element in the xml document returned to the AS. In addition, if MTRR is applicable (see 3GPP TS 23.018), the HSS shall set an MTRR-Indication in the xml document. See 3GPP TS 23.292.

4c. If Data Off exempt service is requested and the Data Off service has been activated, the HSS shall include the "Data Off Exempt Services" element in the xml document returned to the AS.

7.6 Data

This information element contains an XML document conformant to the XML schema defined in Annex D.

……

Table 7.6.1: Data accessible via Sh interface

| Data Ref. | XML tag | Defined in | Access key | Operations |
|---|---|---|---|---|
| 0 | RepositoryData | 7.6.1 | Data Reference + ( IMS Public User Identity OR Public Service Identity ) + Service Indication | Sh-Pull Sh-Update Sh-Subs-Notif (Note 1, Note 3) |

| 10 | IMSPublicIdentity | 7.6.2 | Data Reference + ( IMS Public User Identiy OR Public Service Identity OR MSISDN ) + [ Requested Identity Set ] | Sh-Pull Sh-Subs-Notif |
| ... | ..... | .... | .... | .... |
| 32 | IMSI | 7.6.24 | Data Reference + IMS Public User Identity + [ Private Identity ] | Sh-Pull (Note 5) (Note 8) |
| 33 | IMSPrivateUserIdentity | 7.6.25 | Data Reference + IMS Public User Identity | Sh-Pull Sh-Subs-Notif (Note 8) |
| | USSIRegistration info | 7.6.YY | | |
| 34 | Data Off Exempt services | 7.6.XX | | Sh-Pull Sh-Subs-Notif |
| 35 | Service Information | 7.6.XX+1 | | |

Note 1: If an AS subscribes to a Specific PSI matching a Wildcarded PSI, the notification shall be sent as if the subscription was made to the corresponding Wildcarded PSI.

If an AS requires reading for a Specific PSI matching a Wildcarded PSI, the response shall be sent as if the request was made to the corresponding Wildcarded PSI.

Note 2: If not specified otherwise Public User Identity and Public Service Identity refer also to the wildcarded identities.

Note 3: Any IMS Public User Identity in an Alias Public User Identity Set may be used as a key for the repository data of the group. All IMS Public User Identities within the same set shall be considered alias of each other and shall share the same transparent data. See 3GPP TS 23.008 for the definition of an Alias Public User Identity Set.

Note 4: If several MSISDNs are associated to the Public identity, an AS shall be required to indicate the IMS Private User Identity to fetch the C-MSISDN. See 3GPP TS 23.003 and 3GPP TS 23.237 for the definition of C-MSISDN. ExtendedMSISDN is returned in addition to MSISDN when Additional-MSISDN feature is enabled Note 5: If a Sh procedure refers to a specific Private Identity within a set of multiple Private identities associated to an IMS Public User Identity or MSISDN, the corresponding Sh request shall include this Private Identity as part of the access key.

Note 6: Serving Node Indication is optionally included only if Current Location takes the value DoNotNeedInitiateActiveLocationRetrieval Note 7: Requested Nodes is only applicable when Requested Domain is PS Note 8: IMSI and IMS Private User Identity may be considered sensitive data, which not all ASs may be permitted to retrieve. See clause 6.2.

7.6.XX Data Off Exempt Services

This information element indicates the status of Data Off Exempt Services over PS access. There can be a list of values that are described below.

The possible values for Data Off Exempt Services over PS are:

- IMS-VOICE-OVER-PS-NOT-SUPPORTED (0)

- IMS-VOICE-OVER-PS-Allowed (1)
- IMS-VIDEO-OVER-PS-Allowed (2)
- IMS-USSI-Allowed (3)
- IMS-SMSoverPS-Allowed (4)

ALTERNATIVE

This information element indicates that services cannot be provided to the UE over PS access.

ALTERNATIVE

This information element if received from the
- AS indicates that information is required regarding Data Off service;
- HSS indicates that Data Off Service has been activated.

ALTERNATIVE

This information element indicates that services can or cannot be provided to the UE over PS access.

The possible values for Data Off Exempt Services over PS are:
- SERVICE-OVER-PS-NOT-ALLOWED (0)
- SERVICE-OVER-PS-ALLOWED (1)
- SOME IMS SERVICE ARE ALLOWED OVER PS

ALTERNATIVE

This information element indicates that 3GPP Data Off has been activated.

7.6.XX+1    Service Information

This information element indicates/conveys the service(s) description It may contain one to many of the following information elements:
- ICSI
- IARI
- SIP METHOD

- Content Type

ALTERNATIVE

This information element indicates which services are being requested over PS access.

There can be a list of value.

The possible values for Service Requested are:
- IMS-VOICE-OVER-PS- (1)
- IMS-VIDEO-OVER-PS- (2)
- IMS-USSI- (3)
- IMS-SMSoverPS- (4)

7.6.XX+2   ICSI

This information element contains an ICSI value.

For a more detailed description, refer to 3GPP TS 29.214 subclause 5.3.5.

7.6.XX+3   IARI

This information element contains an IARI value.

For a more detailed description, refer to 3GPP TS 29.214 subclause 5.3.5.

7.6.XX+4   SIP METHOD

This information element contains an SIP METHOD value.

The possible values for SIP METHD are:
- INVITE (0)
- MESSAGE (1)
- INFO (2)
- REFER (3)
-

7.6.XX+5   Content type

This information element includes the Content type that was received in the SIP METHOD.

For a more detailed description, refer to 3GPP TS 29.214 subclause 5.3.5

> 7.6.YYUSSIRegistrationInfo
>
> This information element contains an USSI-GW address. For the definition of an USSI-GW Address, see 3GPP TS 23.008.

*Table 15 - Modified 3GPP TS 29.328*

> 10.4.2 Terminating Access Domain Selection
>
> When the SCC AS serving the terminating UE receives an initial SIP INVITE request due to initial filter criteria and a session used for IMS PS voice does not exist for the UE, the SCC AS may perform:
>
> 0) the procedures as described in 3GPP TS 29.328 to determine if IMS voice over PS session is supported or unknown over the Radio Access Technology the UE is current on<u>;</u>
>
> <u>1) the procedures as described in 3GPP TS 29.328 to request notification if 3GPP PS Data Off has been activated for the URI in the Request-URI of the initial SIP INVITE.</u>

*Table 16 – Proposed changes to 3GPP TS 24.292*

| |
|---|
| 7.2b Access Domain Selection for terminating sessions |
| ……….. |
| For terminating sessions: |
| - T-ADS is always performed after the terminating services. |
| The T-ADS may take the following factors (but not limited to) into account for the selection decision: |
| - The service requested (e.g., voice call, file transfer, image share, etc.) in the incoming session. |
| - The state of the UE in the circuit switched domain. This state information shall be included: Detached, Attached. |
| - The state of the UE in the IMS. The state information shall include: Registered, Unregistered. |
| - The UE capabilities. |
| - The access network capabilities including the information whether IMS voice over PS Session is supported (as specified in TS 23.060 and TS 23.401) by the 3GPP access network that had the most recent radio contact with the UE. |
| - The media components included in the incoming session. |
| - User preferences and operator policy. |
| - <u>*If the "Data Off" feature as specified in 3GPP TS 22.011 is active and what features are exempt.*</u> |
| The T-ADS shall take into account the domains / access types used by an existing session. |

*Table 5 – Changes to 3GPP TS 23.221*

6.1.3 Subscription to notifications (Sh-Subs-Notif)

This procedure is used between the AS and the HSS. The procedure is invoked by the AS and is used:

- To subscribe to Notifications for when particular transparent and/or non-transparent data for a specified IMS Public User Identity or Public Service Identity is updated, from the HSS.
- Optionally to request the user data from the HSS in the same operation.

This procedure is mapped to the commands Subscribe-Notifications-Request/Answer in the Diameter application specified in 3GPP TS 29.329. Tables 6.1.3.1 and 6.1.3.2 detail the information elements involved.

Table 6.1.3.1: Sh-Subs-Notif

| Information element name | Mapping to Diameter AVP | Cat. | Description |
|---|---|---|---|
| User Identity (See 7.1) | User-Identity | M | IMS Public User Identity or Public Service Identity or MSISDN for which notifications of data changes are requested. See section 7.1 for the content of this AVP. |
| ……… | | | |
| Service Indication (See 7.4) | Service-Indication | C | IE that identifies, together with the User Identity and Data-Reference, the set of service related transparent data for which notifications of changes are requested. Check table 7.6.1 to see when it is applicable[1]. |
| …… | | | |
| Private identity (see 7.6.19) | User-Name | O | Private Identity of the user for whom the data is required. Check table 7.6.1 to see when it is applicable. |

---

[1] See *Table*

*Table 68 - 3GPP TS 29.328 applicable message and data*

6.1.4 Notifications (Sh-Notif)

This procedure is used between the HSS and the AS. The procedure is invoked by the HSS and is used:

- To inform the AS of changes in transparent and/or non-transparent data to which the AS has previously subscribed to receive Notifications for, using Sh-Subs-Notif (see 6.1.3).

This procedure is mapped to the commands Push-Notification-Request/Answer in the Diameter application specified in 3GPP TS 29.329. Tables 6.1.4.1 and 6.1.4.2 detail the involved information elements.

Table 6.1.4.1: Sh-Notif

| Information element name | Mapping to Diameter AVP | Cat. | Description |
|---|---|---|---|
| User Identity (See 7.1) | User-Identity | M | IMS Public User Identity or Public Service Identity or MSISDN for which data has changed. If the request refers to a Wildcarded PSI, the HSS may include any PSI matching the corresponding Wildcarded PSI in this information element. The AS shall find the corresponding Wildcarded PSI with this information. See section 7.1 for the content of this AVP. |
| ….. | | | |
| Data (See 7.6)[2] | User-Data | M | Changed data. |

*Table 19 - 3GPP TS 29.328 applicable message and data*

---

[2] See *Table*

> 9.4  SCC AS
>
> 9.4.X  3GPP Data Off termination
>
> When the SCC AS receives an Sh-Notif that contains a URI that is associated with an existing session the SCC AS shall perform the procedures as described in 3GPP TS 29.328 to determine if
>
> > I) The service as described in the SDP Offer received in the initial SIP INVITE that contains the URI in the R-URI is a "Data Off" exempt service.
>
> ALTERNATIVE
>
> > ii) if "Data Off" is active and what services are exempt.
>
> ALTERNATIVE
>
> > ii) if the service received in the initial SIP INVITE is allowed to be delivered over PS.

Table 20 – Proposed changes to 3GPP TS 24.292

> 9.4  SCC AS
>
> 9.4.X  3GPP Data Off termination
>
> ......
>
> The SCC AS shall
>
> - if T-ADS results in choosing to terminate the service, shall send a SIP XXX on to the originating and terminating UE.

Table 21 – Proposed changes to 3GPP TS 24.292

Functional description

The UE shall proceed as follows:

1) If the UE is located/attached to the HPLMN, the "Data Off information" as described in 3GPP TS 24.312 or 3GPP TS 31.102 is provisioned and a) an entry for the HPLMN in the "Data Off information" as described in 3GPP TS 24.312 or 3GPP TS 31.102, the UE shall determine if the service being requested matches a service description provisioned against the HPLMN entry. If the service is i) allowed (exempt) the UE shall let the service proceed; or ii) not allowed the service request shall be terminated and optionally an indication provided.

b) an entry for the HPLMN is not available in the "Data Off information" as described in 3GPP TS 24.312 or 3GPP TS 31.102 but an entry for "Any_PLMN" is available, the UE shall determine if the service being requested matches a service description provisioned against the "Any_PLMN" entry. If the service is i) allowed (exempt) the UE shall let the service proceed; or ii) not allowed the service request shall be terminated and optionally an indication provided.

c) no entry for the HPLMN or "Any_PLMN" but includes the country code matching the MCC of the HPLMN, the UE shall determine if the service being requested matches a service description provisioned against the matching country code entry. If the service is i) allowed (exempt), the UE shall let the service proceed; or ii) not allowed, the service request shall be terminated and optionally an indication provided.

d) no entry for the HPLMN or "Any_PLMN", then the service shall be allowed to proceed 2) If the UE is not located in the HPLMN (attached to a VPLMN), if the "Data Off information" is provisioned and there is a) an entry for the VPLMN is available in the "Data Off information", the UE shall determine if the service being requested matches a service description provisioned against the HPLMN entry. If the service is i) allowed (exempt), the UE shall let the service proceed; or ii) not allowed, the service request shall be terminated and optionally an indication provided.

b) an entry for the VPLMN is not available in the "Data Off information" but an entry for "Any_PLMN" is available, the UE shall determine if the service being requested matches a service description provisioned against the "Any_PLMN" entry. If the service is i) allowed (exempt), the UE shall let the service proceed; or ii) not allowed, the service request shall be terminated and optionally an indication provided.

c) no entry for the VPLMN or "Any_PLMN" but includes the country code matching the MCC of the VPLMN, the UE shall determine if the service being requested matches a service description provisioned against the matching country code entry. If the service is i) allowed (exempt), the UE shall let the service proceed; or ii) not allowed, the service request shall be terminated and optionally an indication provided.

d) no entry for the VPLMN or "Any_PLMN", then the service shall be allowed to proceed 3) If the Data Off information is not provisioned the UE shall let the service proceed.

Data Off information 3GPP TS 24.312 representation

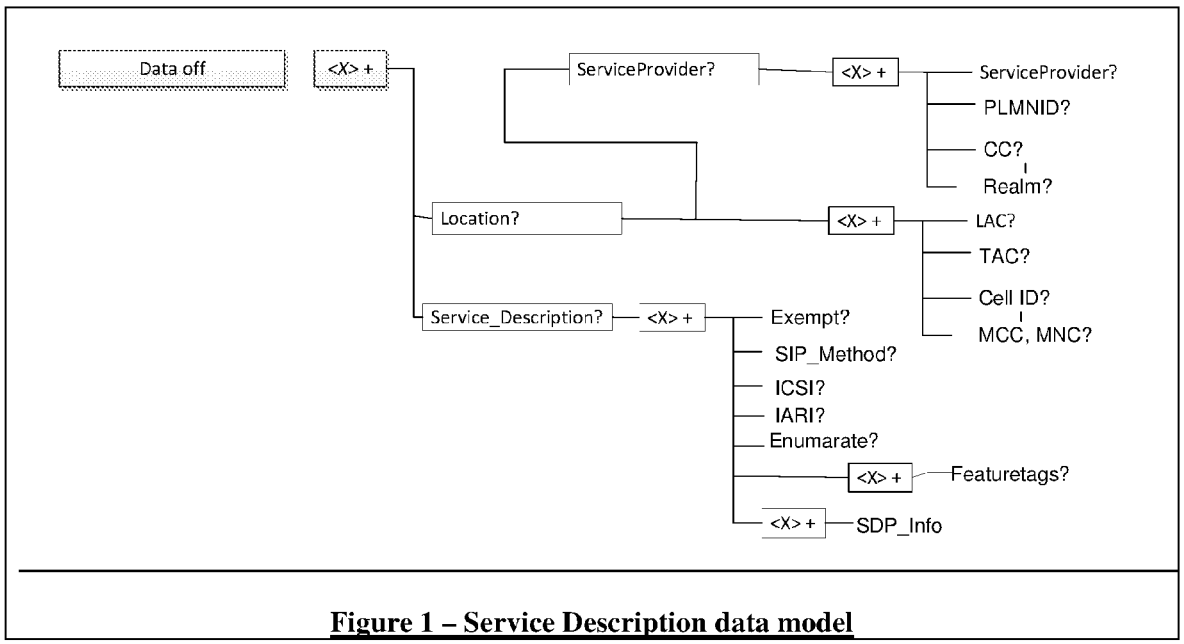
Figure 1 – Service Description data model
*Table 7*

5.2 Structure and coding of TERMINAL PROFILE

Direction: ME to UICC.

The command header is specified in TS 31.101.

Xth byte:

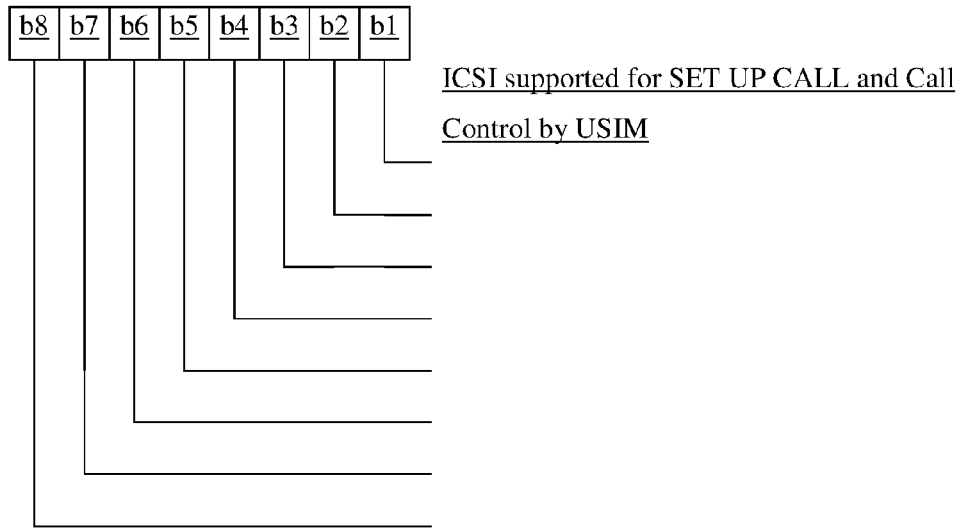

ICSI supported for SET UP CALL and Call Control by USIM

6.6.12 SET UP CALL

| Description | Clause | M/O/C | Min | Length |
|---|---|---|---|---|
| Proactive UICC command Tag | 9.2 | M | Y | 1 |
| Length (A+B+C+D+E+F+G+H+I+J+K+L+M+N) | - | M | Y | 1 or 2 |
| Command details | 8.6 | M | Y | A |
| Device identities | 8.7 | M | Y | B |
| …….. | | | | |
| Frame Identifier | 8.80 | O | N | M |
| Media Type | 8.132 | O | N | N |
| ICSI | 8.XXX | O | N | O |

.....

When the ICSI data object is present, it indicates the service the ME shall use, if supported by the ME to set up the communication. If the ME is unable to set up the call as requested, it shall return an error code reflecting the cause of the error. For example, in case of failure due to network constraints, the error code "Access Technology unable to process command" shall be used.

7.3.1.6 Structure of ENVELOPE (CALL CONTROL)

Direction: ME to UICC.

The command header is specified in TS 31.101 [13].

Command parameters/data.

| Description | Clause | M/O/C | Min | Length |
|---|---|---|---|---|
| Call control tag | 9.1 | M | Y | 1 |
| Length (A+B+C+D+E+F+G) | - | M | Y | 1 or 2 |
| Device identities | 8.7 | M | Y | A |
| Address or SS string or USSD string or PDP context activation parameters or EPS PDN connection activation parameters or IMS URI | 8.1, 8.14 or 8.17 or 8.72 or 8.98 or 8.108 | M | Y | B |
| ...... | | | | |
| Media Type | 8.132 | C | N | G |
| URI truncated | 8.135 | C | N | 2 |
| ICSI | 8.XXX | O | N | |

-.....

- ICSI: This data object indicates the type of service the ME is proposing using to set up the communication. If the type of ICSI to be used by the ME is one of those listed in the Terminal Profile and if the "ICSI Type support" service is allocated and activated in the USIM or ISIM Service Table, the ICSI data object shall be present.

- URI truncated: This data object indicates that the URI in the request was truncated because too long to be transmitted to the UICC.

Response parameters/data.

It is permissible for the UICC to provide no response data, by responding with SW1/SW2 = '90 00'. If the UICC does not provide any response data, then this shall have the same meaning as "allowed, no modification".

| Description | Clause | M/O/C | Min | Length |
|---|---|---|---|---|
| Call control result | - | M | Y | 1 |
| Length (A+B+C+D+E+F+G) | - | M | Y | 1 or 2 |
| Address or SS string or USSD string or PDP context activation parameters or EPS PDN connection activation parameters or IMS URI | 8.1, 8.14 or 8.17 or 8.72 or 8.98 or 8.108 | O | N | A |
| Capability configuration parameters 1 | 8.4 | O | N | B |
| Subaddress | 8.3 | O | N | C |
| Alpha identifier | 8.2 | O | N | D |
| BC repeat indicator | 8.42 | C | N | E |
| Capability configuration parameters 2 | 8.4 | O | N | F |
| Media Type | 8.132 | O | N | G |
| ICSI | 8.xxx | O | N | H |

.....

- ICSI: This data object is required if the UICC requests the ICSI of the call to be modified. If the ICSI Type is not present, then the ME shall assume the ICSI type of the call is not to be modified.

7.3.1.9 Procedure for IMS communications establishment

If the service "communication control for IMS by USIM" is available in the USIM Service Table (see TS 31.102), then for all IMS communication establishment, the ME shall first pass the corresponding IMS Request-URI contained in SIP INVITE message (see TS24.229) to the UICC, using the ENVELOPE (CALL CONTROL) command defined above. The ME shall also pass to the UICC in the ENVELOPE (CALL CONTROL) command the current serving cell if the IMS communication is established over GERAN, UTRAN or E-UTRAN. If the type of media to be used by the ME is one of those listed in the Terminal Profile and if the "Media Type support" service is allocated and activated in the USIM or ISIM Service Table, the ME shall pass to the UICC in the ENVELOPE (CALL CONTROL) command the media type of the SIP communication session it is setting up. If the type of ICSI to be used by the ME is one of those listed in the Terminal Profile and if the "ICSI Type support" service is allocated and activated in the USIM or ISIM Service Table, the ME shall pass to the UICC in the ENVELOPE (CALL CONTROL) command the ICSI type of the SIP communication session it is setting up.

8.XXX      ICSI

| Byte(s) | Description | Length |
|---|---|---|
| 2) 1 | ICSI tag | 3) 1 |
| 4) 2 | Length = 'X' | 5) 1 |
| 6) 3 | ICSI TLV tag | 7) 1 |
| 8) 4 | ICSI TLV length' | 9) 1 |
| 10) 5+Y | ICSI | 11) Y |

It shall be possible to encode multiple ICSIs in the information element.

Coding:

- ICSI value shall be coded as specified in TS 24.229.

*Table 83 – Proposed changes to 3GPP TS 31.111*

| 4.2.8 EF<sub>UST</sub> (USIM Service Table) |
|---|

This EF indicates which services are available. If a service is not indicated as available in the USIM, the ME shall not select this service.

......

Service n°104     IMS call disconnection cause

Service n°105     URI support for MO SHORT MESSAGE CONTROL

Service n°106     ePDG configuration Information support

Service n°107     ePDG configuration Information configured

<u>Service n°108     ICSI Type support</u>

*Table 24 – Proposed changes to 3GPP TS 31.102*

7.3.1 Call Control by USIM

7.3.1.1 Procedure for mobile originated calls

If the service "call control" is available in the USIM Service Table (see TS 31.102), then the ME shall follow the procedure described in ETSI TS 102 223 clause 7.3.1.1 with the additional rules listed here:

- when the user is dialling "112" or an emergency call code stored in EF$_{ECC}$, the ME shall set up an emergency call instead of passing the call set-up details to the UICC;

7.3.1.7 Procedure for PDP Context Activation

.....

When the ME performs an emergency PDP context activation, the ME shall not send the ENVELOPE (CALL CONTROL) command to the UICC.

7.3.1.8 Procedure for EPS PDN connection Activation

.....

When the ME performs an emergency EPS PDN connection activation, the ME shall not send the ENVELOPE (CALL CONTROL) command to the UICC.

7.3.1.9 Procedure for IMS communications establishment

......

When the ME detects that an IMS emergency call is being initiated, the ME shall set up an emergency call without sending the ENVELOPE (CALL CONTROL) command to the UICC.

*Table 25 – Extract from 3GPP TS 31.111*

What is claimed is:

1. A method in a user equipment (UE) to activate "Data Off" services using protocol configuration options, the method comprising:
   sending a first indication to a first network node as part of the protocol configuration options, the first indication including a Data Off indication indicating whether a "Data Off" service is activated, the first indication further comprising a list of Provisioned Services for "Data Off", a user identity and location information for the user identity, wherein the list of Provisioned Services is based on the location information for the user identity; and
   if the Data Off indication indicates that the "Data Off" service is deactivated, receiving downlink data from the first network node; and
   if the Data Off indication indicates that the "Data Off" service is activated, either receiving no downlink data from the first network node or receiving an error message from the first network node.

2. The method of claim 1, wherein the UE comprises a mobile equipment.

3. The method of claim 2, wherein the UE further comprises a Universal Integrated Circuit Card (UICC).

4. The method of claim 1, wherein the first network node is a Packet Data Network Gateway (P-GW).

5. The method of claim 1, wherein receiving downlink data from the first network node comprises receiving downlink data for the user identity.

6. The method of claim 1, wherein the UE has not yet attached to a cellular network, the first indication is an Attach Request.

7. The method of claim 1, wherein the UE is currently attached to a cellular network, the first indication is a Request Bearer Resource Modification message.

8. A user equipment (UE) for activating "Data Off" services using protocol configuration options, the UE comprising:
   a communication interface and processor that:
      send a first indication to a first network node as part of the protocol configuration options, the first indication including a Data Off indication indicating whether a "Data Off" service is activated, the first indication further comprising a list of Provisioned Services for "Data Off", a user identity and location information for the user identity, wherein the list of Provisioned Services is based on the location information for the user identity; and
      if the Data Off indication indicates that the "Data Off" service is deactivated, receiving downlink data from the first network node; and
      if the Data Off indication indicates that the "Data Off" service is activated, either receiving no downlink data from the first network node or receiving an error message from the first network node.

9. The UE of claim 8, wherein the UE is a mobile equipment.

10. The UE of claim 9, wherein the UE further comprises a Universal Integrated Circuit Card (UICC).

11. The UE of claim 8, wherein the first network node is a Packet Data Network Gateway (P-GW).

12. The UE of claim 8, wherein receiving downlink data from the first network node comprises receiving downlink data for the user identity.

13. The UE of claim 8, wherein the UE has not yet attached to a cellular network, the first indication is an Attach Request.

14. The UE of claim 8, wherein the UE is currently attached to a cellular network, the first indication is a Request Bearer Resource Modification message.

15. A computer program product for activating "Data Off" services using protocol configuration options, the computer program product comprising:
   a non-transitory storage medium readable by a processing circuit and storing instructions for execution by the processing circuit for:
   sending a first indication from a user equipment (UE) to a first network node as part of the protocol configuration options, the first indication including a Data Off indication indicating whether a "Data Off" service is activated, the first indication further comprising a list of Provisioned Services for "Data Off", a user identity and location information for the user identity, wherein the list of Provisioned Services is based on the location information for the user identity; and
   if the Data Off indication indicates that the "Data Off" service is deactivated, receiving downlink data from the first network node; and
   if the Data Off indication indicates that the "Data Off" service is activated, either receiving no downlink data from the first network node or receiving an error message from the first network node.

16. A method in packet data network gateway (P-GW) to activate "Data Off" services using protocol configuration options, the method comprising:
   receiving a first indication from a user equipment (UE) as part of the protocol configuration options, the first indication including a Data Off indication indicating whether a "Data Off" service is activated, the first indication further comprising a list of Provisioned Services for "Data Off", a user identity and location information for the user identity, wherein the list of Provisioned Services is based on the location information for the user identity; and
   if the Data Off indication indicates that the "Data Off" service is deactivated, sending downlink data to the UE; and
   if the Data Off indication indicates that the "Data Off" service is activated, either sending no downlink data to the UE or sending an error message to the UE.

17. The method of claim 16, wherein sending downlink data from the first network node comprises receiving downlink data for the user identity.

18. The method of claim 16, wherein the UE has not yet attached to a cellular network, the first indication is an Attach Request.

19. The method of claim 16, wherein the UE is currently attached to a cellular network, the first indication is a Request Bearer Resource Modification message.

20. The method of claim 16, wherein the first indication is received from the UE via a mobile mobility management entity (MME) through a serving gateway (S-GW).

21. A packet data network gateway (P-GW) for activating "Data Off" services using protocol configuration options, the P-GW comprising:
   a communication interface and processor that:
      send a first indication to a first network node as part of the protocol configuration options, the first indication including a Data Off indication indicating whether a "Data Off" service is activated, the first indication further comprising a list of Provisioned Services for "Data Off", a user identity and location information for the user identity, wherein the list of Provisioned Services is based on the location information for the user identity; and if the Data Off indication indicates that the "Data Off" service is deactivated, receiving downlink data from the first network node; and if the Data Off indication indicates that the "Data Off" service is activated, either receiving no downlink data from the first network node or receiving an error message from the first network node.

22. A computer program product for activating "Data Off" services using protocol configuration options, the computer program product comprising:

a non-transitory storage medium readable by a processing circuit and storing instructions for execution by the processing circuit for:

receiving, at a packet data network gateway (P-GW), a first indication from a user equipment (UE) as part of the protocol configuration options, the first indication including a Data Off indication indicating whether a "Data Off" service is activated, the first indication further comprising a list of Provisioned Services for "Data Off", a user identity and location information for the user identity, wherein the list of Provisioned Services is based on the location information for the user identity; and if the Data Off indication indicates that the "Data Off" service is deactivated, sending downlink data to the UE; and if the Data Off indication indicates that the "Data Off" service is activated, either sending no downlink data to the UE or sending an error message to the UE.

* * * * *